(12) United States Patent
Takigawa et al.

(10) Patent No.: US 9,090,806 B2
(45) Date of Patent: Jul. 28, 2015

(54) REFRIGERANT OIL FOR FREEZERS AND OPERATING FLUID COMPOSITION FOR FREEZERS

(75) Inventors: Katsuya Takigawa, Tokyo (JP); Yuji Shimomura, Tokyo (JP); Masanori Saito, Tokyo (JP); Ken Sawada, Tokyo (JP); Takeshi Okido, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 244 days.

(21) Appl. No.: 13/392,317

(22) PCT Filed: Aug. 16, 2010

(86) PCT No.: PCT/JP2010/063810
§ 371 (c)(1),
(2), (4) Date: May 11, 2012

(87) PCT Pub. No.: WO2011/024663
PCT Pub. Date: Mar. 3, 2011

(65) Prior Publication Data
US 2012/0228541 A1      Sep. 13, 2012

(30) Foreign Application Priority Data

| Aug. 28, 2009 | (JP) | P2009-198730 |
|---|---|---|
| Aug. 28, 2009 | (JP) | P2009-198733 |
| Aug. 28, 2009 | (JP) | P2009-198737 |
| Aug. 28, 2009 | (JP) | P2009-198740 |
| Aug. 28, 2009 | (JP) | P2009-198745 |
| Aug. 28, 2009 | (JP) | P2009-198749 |
| Aug. 28, 2009 | (JP) | P2009-198756 |

(51) Int. Cl.
*C09K 5/04* (2006.01)
*C10M 171/00* (2006.01)

(52) U.S. Cl.
CPC ............ *C09K 5/045* (2013.01); *C10M 171/008* (2013.01); *C09K 2205/106* (2013.01); *C09K 2205/11* (2013.01); *C09K 2205/12* (2013.01); *C09K 2205/122* (2013.01); *C09K 2205/126* (2013.01); *C09K 2205/134* (2013.01); *C10M 2207/026* (2013.01); *C10M 2207/042* (2013.01); *C10M 2207/0406* (2013.01); *C10M 2207/24* (2013.01); *C10M 2207/281* (2013.01); *C10M 2207/289* (2013.01); *C10M 2209/043* (2013.01); *C10M 2209/103* (2013.01); *C10M 2209/107* (2013.01); *C10M 2209/1033* (2013.01); *C10M 2209/1045* (2013.01); *C10M 2209/1055* (2013.01); *C10M 2209/1075* (2013.01); *C10M 2209/1085* (2013.01); *C10M 2215/02* (2013.01); *C10M 2215/064* (2013.01); *C10M 2215/065* (2013.01); *C10M 2215/223* (2013.01); *C10M 2219/106* (2013.01); *C10M 2223/04* (2013.01); *C10M 2223/041* (2013.01); *C10M 2223/043* (2013.01); *C10M 2223/049* (2013.01); *C10N 2220/302* (2013.01); *C10N 2230/06* (2013.01); *C10N 2230/08* (2013.01); *C10N 2230/10* (2013.01); *C10N 2230/20* (2013.01); *C10N 2230/66* (2013.01); *C10N 2240/30* (2013.01)

(58) Field of Classification Search
CPC ................. C09K 2205/126; C10M 2209/1033
USPC ............................................ 252/68; 508/579
See application file for complete search history.

(56) References Cited

U.S. PATENT DOCUMENTS

| 4,751,012 | A | 6/1988 | Ward et al. |
|---|---|---|---|
| 6,878,677 | B1 | 4/2005 | Sakanoue et al. |
| 8,480,919 | B2 * | 7/2013 | Kaneko et al. ................. 252/68 |
| 2005/0256014 | A1 | 11/2005 | Sherman et al. |
| 2009/0082232 | A1 | 3/2009 | Ikeda et al. |
| 2009/0318316 | A1 | 12/2009 | Morishima |

FOREIGN PATENT DOCUMENTS

| EP | 2 236 589 | 10/2010 |
|---|---|---|
| JP | 2-242888 | 9/1990 |
| JP | 3-200895 | 9/1991 |
| JP | 3-217495 | 9/1991 |
| JP | 6-128578 | 5/1994 |
| JP | 2000-282076 | 10/2000 |
| JP | 2006-512426 | 4/2006 |
| JP | 2006-316147 | 11/2006 |
| JP | 2008-069234 | 3/2008 |
| JP | 2008-208262 | 9/2008 |
| JP | 2000-256692 | 9/2009 |
| WO | 2009/066722 | 5/2005 |
| WO | 2005/103190 | 11/2005 |
| WO | 2006/094303 | 9/2006 |
| WO | WO 2006/130026 | * 10/2008 |
| WO | 2009/101872 | 8/2009 |
| WO | 2009/101873 | 8/2009 |

OTHER PUBLICATIONS

Office Action for JP Application No. P2009-198740, mailed on Jun. 18, 2013.

(Continued)

*Primary Examiner* — John Hardee
(74) *Attorney, Agent, or Firm* — Greenblum & Bernstein, P.L.C.

(57) ABSTRACT

The working fluid composition for a refrigerating machine of this invention comprises a base oil containing an ether-based compound, an amine salt of an acidic phosphoric acid ester, at least one compound selected from the group consisting of amine-based antioxidants, metal inactivating agents and alicyclic epoxy compounds, and an unsaturated fluorinated hydrocarbon refrigerant. The refrigerating machine oil of the invention comprises a base oil containing an ether-based compound, an amine salt of an acidic phosphoric acid ester, and at least one compound selected from the group consisting of amine-based antioxidants, metal inactivating agents and alicyclic epoxy compounds, and it is to be used together with an unsaturated fluorinated hydrocarbon refrigerant.

19 Claims, No Drawings

(56) References Cited

OTHER PUBLICATIONS

U.S. Appl. No. 13/299,652 to Sawada et al., which was filed on Nov. 18, 2011.
English translation of International Preliminary Report on Patentability for PCT/JP2010/063810, mailed Mar. 22, 2012.
English and Japanese versions of International Search Report for PCT/JP2010/063810, mailed Oct. 26, 2010.
Search Report for EP Application No. 10811713.6, mailed May 6, 2013.
Japanese Office Action issued with respect to Japanese Patent Application No. 2009-198733, mailed Jul. 2, 2013.

* cited by examiner

REFRIGERANT OIL FOR FREEZERS AND OPERATING FLUID COMPOSITION FOR FREEZERS

TECHNICAL FIELD

The present invention relates to a refrigerating machine oil and to a working fluid composition for a refrigerating machine.

BACKGROUND ART

In light of the problem of ozone layer depletion that is a focus of attention in recent years, the restrictions on CFCs (chlorofluorocarbons) and HCFCs (hydrochlorofluorocarbons) that are used as refrigerants in conventional refrigerating machines have become more stringent, and HFCs (hydrofluorocarbons) are being used as substitute refrigerants.

Mineral oils or hydrocarbon oils such as alkylbenzenes have been preferred for use as refrigerating machine oils when CFCs or HCFCs are the refrigerants, but since changing the refrigerant can cause the refrigerating machine oil used with it to exhibit unpredictable behavior in terms of its compatibility with the refrigerant, its lubricity, its viscosity when dissolved with refrigerants and its thermal and chemical stability, it has been necessary to develop different refrigerating machine oils for different refrigerants. Examples of refrigerating machine oils that have been developed for HFC refrigerants include polyalkylene glycols (see Patent document 1), esters (see Patent document 2), carbonic acid esters (see Patent document 3) and polyvinyl ethers (see Patent document 4).

HFC-134a is an HFC refrigerant that is routinely used as a refrigerant for automobile air conditioners, and while it has an ozone depletion potential (ODP) of zero, its high global warming potential (GWP) has led to its restriction in Europe. It has therefore become an urgent issue to develop refrigerants that can be used as substitutes for HFC-134a.

In light of this background it has been proposed to use, as substitute refrigerants for HFC-134a, unsaturated fluorinated hydrocarbon refrigerants which have very low ODP and GWP, are noncombustible and are comparable or superior to HFC-134a in terms of their thermodynamic properties, as a measure of refrigerant performance. There has also been proposed the use of refrigerant mixtures of unsaturated fluorinated hydrocarbons with saturated hydrofluorocarbons, C3-5 saturated hydrocarbons, dimethyl ether, carbon dioxide, bis(trifluoromethyl)sulfide or trifluoroiodomethane (see Patent document 5).

In addition, there have been proposed refrigerating machine oils that employ mineral oils, alkylbenzenes, poly α-olefins, polyalkyleneglycols, monoesters, diesters, polyol esters, phthalic acid esters, alkyl ethers, ketones, carbonic acid esters, polyvinyl ethers and the like, as refrigerating machine oils that can be used with unsaturated fluorinated hydrocarbon refrigerants or refrigerant mixtures of unsaturated fluorinated hydrocarbons and saturated hydrofluorocarbons, C3-5 saturated hydrocarbons, dimethyl ether, carbon dioxide, bis(trifluoromethyl)sulfide or trifluoroiodomethane (see Patent documents 5-7).

CITATION LIST

Patent Literature

[Patent document 1] Japanese Unexamined Patent Application Publication HEI No. 02-242888

[Patent document 2] Japanese Unexamined Patent Application Publication HEI No. 03-200895

[Patent document 3] Japanese Unexamined Patent Application Publication HEI No. 03-217495

[Patent document 4] Japanese Unexamined Patent Application Publication HEI No. 06-128578

[Patent document 5] International Patent Publication No. WO2006/094303

[Patent document 6] Japanese Patent Public Inspection No. 2006-512426

[Patent document 7] International Patent Publication No. WO2005/103190

SUMMARY OF INVENTION

Technical Problem

In refrigeration systems employing unsaturated fluorinated hydrocarbon refrigerants, as described in Patent documents 5, 6 and 7, the refrigerating machine oil employed may be a mineral oil or a hydrocarbon such as an alkylbenzene which is used in CFCs or HCFCs or a polyalkylene glycol, polyol ester or polyvinyl ether which is used in HFCs. Research by the present inventors, however, has shown that it is not possible to achieve a high level of the required performance simply by applying these conventional refrigerating machine oils in the systems mentioned above. Ether-based refrigerating machine oils with polyalkylene glycols or polyvinyl ethers, in particular, can cause problems in systems when the refrigerants or refrigerating machine oils decompose in the presence of unsaturated fluorinated hydrocarbon refrigerants. It has also been shown that, when anti-wear agents that have been commonly used in the prior art are added for improved wear resistance, their stability is further impaired in the presence of unsaturated fluorinated hydrocarbon refrigerants.

The present invention has been accomplished in light of these circumstances, and its object is to provide a refrigerating machine oil and a working fluid composition for refrigerating machines, that can exhibit both stability in the presence of unsaturated fluorinated hydrocarbon refrigerants and a high level of wear resistance, in a refrigeration system that employs an unsaturated fluorinated hydrocarbon refrigerant.

Solution to Problem

In order to solve the problems described above, the invention provides a working fluid composition for a refrigerating machine comprising a base oil containing an ether-based compound, an amine salt of an acidic phosphoric acid ester, at least one compound selected from the group consisting of amine-based antioxidants, metal inactivating agents and alicyclic epoxy compounds, and an unsaturated fluorinated hydrocarbon refrigerant.

The invention further provides a refrigerating machine oil to be used together with an unsaturated fluorinated hydrocarbon refrigerant, comprising a base oil containing an ether-based compound, an amine salt of an acidic phosphoric acid ester, and at least one compound selected from the group consisting of amine-based antioxidants, metal inactivating agents and alicyclic epoxy compounds.

Working fluid compositions for a refrigerating machine according to the following (1) to (7) are preferred modes of the working fluid composition for a refrigerating machine according to the invention.

(1) A working fluid composition for a refrigerating machine comprising:
    a base oil containing an ether-based compound,
    an amine salt of an acidic phosphoric acid ester,
    an amine-based antioxidant and
    an unsaturated fluorinated hydrocarbon refrigerant.

(2) A working fluid composition for a refrigerating machine comprising:
    a base oil containing an ether-based compound,
    an amine salt of an acidic phosphoric acid ester,
    a metal inactivating agent and
    an unsaturated fluorinated hydrocarbon refrigerant.

(3) A working fluid composition for a refrigerating machine comprising:
    a refrigerating machine oil comprising a base oil containing an ether-based compound, an amine salt of an acidic phosphoric acid ester and an alicyclic epoxy compound, and
    an unsaturated fluorinated hydrocarbon refrigerant,
    wherein the content of the amine salt of the acidic phosphoric acid ester is greater than 0 and less than 400 ppm by mass based on the total amount of the refrigerating machine oil.

(4) A working fluid composition for a refrigerating machine comprising:
    a refrigerating machine oil comprising a base oil containing an ether-based compound, an amine salt of an acidic phosphoric acid ester and an alicyclic epoxy compound, and
    an unsaturated fluorinated hydrocarbon refrigerant,
    wherein the content of the amine salt of the acidic phosphoric acid ester is at least 400 ppm by mass based on the total amount of the refrigerating machine oil.

(5) A working fluid composition for a refrigerating machine comprising:
    a refrigerating machine oil comprising a base oil containing an ether-based compound, an amine salt of an acidic phosphoric acid ester, an amine-based antioxidant, a metal inactivating agent and an alicyclic epoxy compound, and
    an unsaturated fluorinated hydrocarbon refrigerant,
    wherein the content of the amine salt of the acidic phosphoric acid ester is greater than 0 and less than 400 ppm by mass based on the total amount of the refrigerating machine oil, (6) A working fluid composition for a refrigerating machine comprising:
    a refrigerating machine oil comprising a base oil containing an ether-based compound, an amine salt of an acidic phosphoric acid ester, an amine-based antioxidant, a metal inactivating agent and an alicyclic epoxy compound, and
    an unsaturated fluorinated hydrocarbon refrigerant,
    wherein the content of the amine salt of the acidic phosphoric acid ester is at least 400 ppm by mass based on the total amount of the refrigerating machine oil.

(7) A working fluid composition for a refrigerating machine comprising:
    a refrigerating machine oil comprising a base oil containing an ether-based compound and an alicyclic epoxy compound, with a moisture content of 300-10,000 ppm by mass, and
    an unsaturated fluorinated hydrocarbon refrigerant.

Refrigerating machine oils according to the following (8) to (14) are preferred modes of the refrigerating machine oil according to the invention.

(8) A refrigerating machine oil comprising:
    a base oil containing an ether-based compound,
    an amine salt of an acidic phosphoric acid ester and an amine-based antioxidant,
    the refrigerating machine oil being used together with an unsaturated fluorinated hydrocarbon refrigerant.

(9) A refrigerating machine oil comprising:
    a base oil containing an ether-based compound,
    an amine salt of an acidic phosphoric acid ester and a metal inactivating agent,
    the refrigerating machine oil being used together with an unsaturated fluorinated hydrocarbon refrigerant.

(10) A refrigerating machine oil comprising:
    a base oil containing an ether-based compound,
    an amine salt of an acidic phosphoric acid ester and an alicyclic epoxy compound,
    wherein the content of the amine salt of the acidic phosphoric acid ester is greater than 0 and less than 400 ppm by mass based on the total amount of the refrigerating machine oil,
    the refrigerating machine oil being used together with an unsaturated fluorinated hydrocarbon refrigerant.

(11) A refrigerating machine oil comprising:
    a base oil containing an ether-based compound,
    an amine salt of an acidic phosphoric acid ester and an alicyclic epoxy compound,
    wherein the content of the amine salt of the acidic phosphoric acid ester is at least 400 ppm by mass based on the total amount of the refrigerating machine oil,
    the refrigerating machine oil being used together with an unsaturated fluorinated hydrocarbon refrigerant.

(12) A refrigerating machine oil comprising:
    a base oil containing an ether-based compound,
    an amine salt of an acidic phosphoric acid ester,
    an amine-based antioxidant,
    a metal inactivating agent and
    an alicyclic epoxy compound,
    wherein the content of the amine salt of the acidic phosphoric acid ester is greater than 0 and less than 400 ppm by mass based on the total amount of the refrigerating machine oil,
    the refrigerating machine oil being used together with an unsaturated fluorinated hydrocarbon refrigerant.

(13) A refrigerating machine oil comprising:
    a base oil containing an ether-based compound,
    an amine salt of an acidic phosphoric acid ester,
    an amine-based antioxidant,
    a metal inactivating agent and
    an alicyclic epoxy compound,
    wherein the content of the amine salt of the acidic phosphoric acid ester is at least 400 ppm by mass based on the total amount of the refrigerating machine oil,
    the refrigerating machine oil being used together with an unsaturated fluorinated hydrocarbon refrigerant.

(14) A refrigerating machine oil comprising:
    a base oil containing an ether-based compound and an alicyclic epoxy compound,
    the refrigerating machine oil having a moisture content of 300-10,000 ppm by mass and being used together with an unsaturated fluorinated hydrocarbon refrigerant.

The working fluid composition for a refrigerating machine of the invention preferably contains at least one compound selected from among 1,2,3,3,3-pentafluoropropene, 1,3,3,3-tetrafluoropropene, 2,3,3,3-tetrafluoropropene, 1,2,3,3-tetrafluoropropene and 3,3,3-trifluoropropene, as an unsaturated fluorinated hydrocarbon refrigerant.

The working fluid composition for a refrigerating machine of the invention may also comprise at least one unsaturated fluorinated hydrocarbon refrigerant (hereunder referred to as "refrigerant (A)") alone, or it may further comprise at least one component selected from among saturated hydrofluorocarbon, C3-5 hydrocarbon, dimethyl ether, carbon dioxide, bis(trifluoromethyl)sulfide and trifluoroiodomethane refrigerants (hereunder referred to as "refrigerant (B)").

In a refrigerant mixture comprising refrigerant (A) and refrigerant (B), the unsaturated fluorinated hydrocarbon refrigerant is preferably at least one selected from among 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye) and 3,3,3-trifluoropropene (HFO-1243zf) refrigerants;
the saturated hydrofluorocarbon is preferably one or more selected from among difluoromethane (HFC-32), pentafluoroethane (HFC-125), 1,1,2,2-tetrafluoroethane (HFC-134), 1,1,1,2-tetrafluoroethane (HFC-134a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa) and 1,1,1,3,3-pentafluorobutane (HFC-365mfc);
and the C3-5 hydrocarbon is preferably at least one selected from among propane, normal-butane, isobutane, 2-methylbutane and normal-pentane.

Advantageous Effects of Invention

As mentioned above, the invention provides a refrigerating machine oil and a working fluid composition for a refrigerating machine, that can exhibit both stability in the presence of unsaturated fluorinated hydrocarbon refrigerants and a high level of wear resistance, in a refrigeration system that employs an unsaturated fluorinated hydrocarbon refrigerant.

DESCRIPTION OF EMBODIMENTS

Preferred embodiments of the invention will now be described in detail.

The refrigerating machine oil according to the first embodiment of the invention comprises a base oil containing an ether-based compound, an amine salt of an acidic phosphoric acid ester, and an amine-based antioxidant, and it is to be used together with an unsaturated fluorinated hydrocarbon refrigerant. A working fluid composition for a refrigerating machine according to the first embodiment comprises a base oil containing an ether-based compound, an amine salt of an acidic phosphoric acid ester, an amine-based antioxidant and an unsaturated fluorinated hydrocarbon refrigerant. The working fluid composition for a refrigerating machine according to the first embodiment encompasses modes that contain the refrigerating machine oil of the first embodiment and an unsaturated fluorinated hydrocarbon refrigerant.

The refrigerating machine oil according to the second embodiment of the invention comprises a base oil containing an ether-based compound, an amine salt of an acidic phosphoric acid ester and a metal inactivating agent, and it is to be used together with an unsaturated fluorinated hydrocarbon refrigerant. A working fluid composition for a refrigerating machine according to the second embodiment comprises a base oil containing an ether-based compound, an amine salt of an acidic phosphoric acid ester, a metal inactivating agent, and an unsaturated fluorinated hydrocarbon refrigerant. The working fluid composition for a refrigerating machine according to the second embodiment encompasses modes that contain the refrigerating machine oil of the second embodiment and an unsaturated fluorinated hydrocarbon refrigerant.

A refrigerating machine oil according to the third embodiment of the invention comprises a base oil containing an ether-based compound, an amine salt of an acidic phosphoric acid ester, and an alicyclic epoxy compound, wherein the content of the amine salt of the acidic phosphoric acid ester is greater than 0 and less than 400 ppm by mass based on the total amount of the refrigerating machine oil, to be used together with an unsaturated fluorinated hydrocarbon refrigerant. A working fluid composition for a refrigerating machine according to the third embodiment comprises a refrigerating machine oil that contains a base oil containing an ether-based compound, an amine salt of an acidic phosphoric acid ester and an alicyclic epoxy compound, and an unsaturated fluorinated hydrocarbon refrigerant, wherein the content of the amine salt of the acidic phosphoric acid ester is greater than 0 and less than 400 ppm by mass based on the total amount of the refrigerating machine oil. The working fluid composition for a refrigerating machine according to the third embodiment encompasses modes that contain the refrigerating machine oil of the third embodiment and an unsaturated fluorinated hydrocarbon refrigerant.

A refrigerating machine oil according to the fourth embodiment of the invention comprises a base oil containing an ether-based compound, an amine salt of an acidic phosphoric acid ester and an alicyclic epoxy compound, wherein the content of the amine salt of the acidic phosphoric acid ester is at least 400 ppm by mass based on the total amount of the refrigerating machine oil, to be used together with an unsaturated hydrocarbon-based refrigerant. A working fluid composition for a refrigerating machine according to the fourth embodiment comprises a refrigerating machine oil that contains a base oil containing an ether-based compound, an amine salt of an acidic phosphoric acid ester and an alicyclic epoxy compound, and an unsaturated fluorinated hydrocarbon refrigerant, wherein the content of the amine salt of the acidic phosphoric acid ester is at least 400 ppm by mass based on the total amount of the refrigerating machine oil. The working fluid composition for a refrigerating machine according to the fourth embodiment encompasses modes that contain the refrigerating machine oil of the fourth embodiment and an unsaturated fluorinated hydrocarbon refrigerant.

A refrigerating machine oil according to the fifth embodiment of the invention comprises a base oil containing an ether-based compound, an amine salt of an acidic phosphoric acid ester, an amine-based antioxidant, a metal inactivating agent and an alicyclic epoxy compound, wherein the content of the amine salt of the acidic phosphoric acid ester is greater than 0 and less than 400 ppm by mass based on the total amount of the refrigerating machine oil, to be used together with an unsaturated fluorinated hydrocarbon refrigerant. A working fluid composition for a refrigerating machine according to the fifth embodiment comprises a refrigerating machine oil that contains a base oil containing an ether-based compound, an amine salt of an acidic phosphoric acid ester, an amine-based antioxidant, a metal inactivating agent and an alicyclic epoxy compound, and an unsaturated fluorinated hydrocarbon refrigerant, wherein the content of the amine salt of the acidic phosphoric acid ester is greater than 0 and less than 400 ppm by mass based on the total amount of the refrigerating machine oil. The working fluid composition for a refrigerating machine according to the fifth embodiment encompasses modes that contain the refrigerating machine oil of the fifth embodiment and an unsaturated fluorinated hydrocarbon refrigerant.

A refrigerating machine oil according to the sixth embodiment of the invention comprises a base oil containing an ether-based compound, an amine salt of an acidic phosphoric acid ester, an amine-based antioxidant, a metal inactivating agent and an alicyclic epoxy compound, wherein the content of the amine salt of the acidic phosphoric acid ester is at least 400 ppm by mass based on the total amount of the refrigerating machine oil, to be used together with an unsaturated fluorinated hydrocarbon refrigerant. A working fluid composition for a refrigerating machine according to the sixth embodiment comprises a refrigerating machine oil that contains a base oil containing an ether-based compound, an amine salt of an acidic phosphoric acid ester, an amine-based antioxidant, a metal inactivating agent and an alicyclic epoxy compound, and an unsaturated fluorinated hydrocarbon refrigerant, wherein the content of the amine salt of the acidic phosphoric acid ester is at least 400 ppm by mass based on the total amount of the refrigerating machine oil. The working fluid composition for a refrigerating machine according to the sixth embodiment encompasses modes that contain the refrigerating machine oil of the sixth embodiment and an unsaturated fluorinated hydrocarbon refrigerant.

A refrigerating machine oil according to the seventh embodiment of the invention comprises a base oil containing an ether-based compound and an alicyclic epoxy compound, wherein the moisture content is 300-10,000 ppm by mass, to be used together with an unsaturated fluorinated hydrocarbon refrigerant. A working fluid composition for a refrigerating machine according to the seventh embodiment of the invention comprises a refrigerating machine oil that contains a base oil containing an ether-based compound and an alicyclic epoxy compound, wherein the moisture content is 300-10,000 ppm by mass, and an unsaturated fluorinated hydrocarbon refrigerant. The working fluid composition for a refrigerating machine according to the seventh embodiment encompasses modes that contain the refrigerating machine oil of the seventh embodiment and an unsaturated fluorinated hydrocarbon refrigerant.

The components in the refrigerating machine oil and working fluid composition for a refrigerating machine according to the first to seventh embodiments will now be explained in detail.

The ether-based compounds composing the base oils for the first to seventh embodiments are not particularly restricted so long as they are compounds having one or more ether bonds in the molecule. Specifically, this includes polyalkylene glycols, polyvinyl ethers, polyphenyl ethers, perfluoroethers and the like, among which polyalkylene glycols and polyvinyl ethers are preferably used.

Examples of polyalkylene glycols include compounds represented by the following formula (1).

(1)

[In formula (1), $R^1$ represents hydrogen, C1-10 alkyl, C2-10 acyl, or a residue of a compound having 2-8 hydroxyl groups, $R^2$ represents C2-4 alkylene, $R^3$ represents hydrogen, C1-10 alkyl or C2-10 acyl, f represents an integer of 1-80, and g represents an integer of 1-8.]

In formula (1), alkyl groups represented by $R^1$ and $R^3$ may be straight-chain, branched or cyclic. The number of carbon atoms in each alkyl group is preferably 1-10 and more preferably 1-6. If the alkyl group is greater than C10, compatibility with the working medium may be reduced.

The alkyl group portions of acyl groups represented by $R^1$ and $R^3$ may also be straight-chain, branched or cyclic. The number of carbon atoms of the acyl group is preferably 2-10 and more preferably 2-6. If the acyl group is greater than C10, compatibility with the working medium may be reduced and phase separation may occur.

When the groups represented by $R^1$ and $R^3$ are both alkyl groups, or when they are both acyl groups, the groups represented by $R^1$ and $R^3$ may be the same or different. When g is 2 or greater, the groups represented by $R^1$ and $R^3$ in the same molecule may be the same or different.

When the group represented by $R^1$ is a residue of a compound having 2-8 hydroxyl groups, the compound may be either linear or cyclic.

Of the polyalkylene glycols represented by formula (1), at least one of $R^1$ and $R^3$ is preferably an alkyl group (more preferably a C1-4 alkyl group), with methyl being especially preferred from the viewpoint of compatibility with the working medium.

From the viewpoint of thermal and chemical stability, both $R^1$ and $R^3$ are preferably alkyl groups (more preferably C1-4 alkyl groups), and most preferably both are methyl groups.

From the viewpoint of facilitating production and lowering cost, one of $R^1$ and $R^3$ is an alkyl group (more preferably a C1-4 alkyl group) while the other is hydrogen, and most preferably one is methyl and the other is hydrogen.

In formula (1), $R^2$ represents a C2-4 alkylene group, specific examples of alkylene groups including ethylene, propylene and butylene. Oxyalkylene groups as repeating units represented by $OR^2$ include oxyethylene, oxypropylene and oxybutylene groups. Multiple oxyalkylene groups in the same molecule may be the same, or they may include two different oxyalkylene groups.

Among polyalkylene glycols represented by formula (1) there are preferred copolymers containing an oxyethylene group (EO) and an oxypropylene group (PO), from the viewpoint of the viscosity-temperature characteristic, in which case, from the viewpoint of the seizure load and the viscosity-temperature characteristic, the proportion of oxyethylene groups of the total oxyethylene and oxypropylene groups (EO/(PO+EO)) is preferably in the range of 0.1-0.8 and more preferably in the range of 0.3-0.6.

From the viewpoint of compatibility with the working medium, hygroscopicity and heat and oxidation stability, the value of EO/(PO+EO) is preferably in the range of 0-0.5, more preferably in the range of 0-0.2, and most preferably 0 (i.e. a propylene oxide homopolymer).

The symbol "f" in formula (1) represents the number of repeating units of oxyalkylene groups $OR^2$ (polymerization degree), and it is an integer of 1-80. Also, g is an integer of 1-8. For example, when $R^1$ is an alkyl group or acyl group, g is 1. When $R^1$ is a residue of a compound having 2-8 hydroxyl groups, g is the number of hydroxyl groups in the compound.

There are no particular restrictions on the product of f and g (f×g), but the average value of f×g is preferably 6-80, to provide a satisfactory balance for the required performance as a lubricant oil for a refrigerating machine.

The number-average molecular weight of the polyalkylene glycol represented by formula (1) is preferably 500-3000, more preferably 600-2000 and even more preferably 600-1500, and n is preferably a number such that the number-average molecular weight of the polyalkylene glycol satisfies the condition mentioned above. If the number-average molecular weight of the polyalkylene glycol is too low, the lubricity may be insufficient in the copresence of an unsaturated fluorinated hydrocarbon refrigerant. If the number-average molecular weight is too high, on the other hand, the compositional range exhibiting compatibility with unsaturated fluorinated hydrocarbon refrigerants under low temperature conditions will be narrowed, potentially resulting in poor refrigerant compressor lubrication or hindered evaporator heat exchange. The ratio of the weight-average molecular weight (Mw) and number-average molecular weight (Mn) (Mw/Mn) in the polyalkylene glycol represented by formula (1) is preferably no greater than 1.00-1.20. If Mw/Mn is greater than 1.20, the compatibility between the unsaturated fluorinated hydrocarbon refrigerant and refrigerating machine oil will tend to be insufficient.

Preferred among the aforementioned polyalkylene glycols, from the viewpoint of economy and the effect described above, are polypropyleneglycol dimethyl ethers represented by the following formula (2) and polyethylenepolypropyleneglycol dimethyl ethers represented by the following formula (3), while preferred from the viewpoint of economy are polypropyleneglycol monobutyl ethers represented by the following formula (4), polypropyleneglycol monomethyl ethers represented by the following formula (5), polyethylenepolypropyleneglycol monomethyl ethers represented by the following formula (6), polyethylenepolypropyleneglycol monobutyl ethers represented by the following formula (7), and polypropyleneglycol diacetates represented by the following formula (8).

$$CH_3O—(C_3H_6O)_h—CH_3 \quad (2)$$

(In the formula, h represents an integer of 6-80.)

$$CH_3O—(C_2H_4O)_i—(C_3H_6O)_j—CH_3 \quad (3)$$

(In the formula, i and j are each 1 or greater, and are numbers such that the total of i and j is 6-80.)

$$C_4H_9O—(C_3H_6O)_k—H \quad (4)$$

(In the formula, k represents an integer of 6-80.)

$$CH_3O—(C_3H_6O)_l—H \quad (5)$$

(In the formula, l represents an integer of 6-80.)

$$CH_3O—(C_2H_4O)_m—(C_3H_6O)_n—H \quad (6)$$

(In the formula, m and n are each 1 or greater, and are numbers such that the total of m and n is 6-80.)

$$C_4H_9O—(C_2H_4O)_m—(C_3H_6O)_n—H \quad (7)$$

(In the formula, m and n are each 1 or greater, and are numbers such that the total of m and n is 6-80.)

$$CH_3COO—(C_3H_6O)_l—COCH_3 \quad (8)$$

(In the formula, l represents an integer of 6-80.)

According to the first to seventh embodiments, the polyalkylene glycol used may be a polyalkyleneglycol derivative having at least one structural unit represented by formula (9).

[Chemical Formula 1]

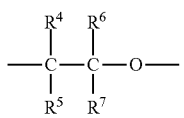

(9)

[In formula (9), $R^4$-$R^7$ may be the same or different, and each represents hydrogen, a C1-10 monovalent hydrocarbon group or a group of the following formula (13):

[Chemical Formula 2]

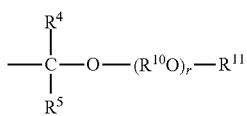

(10)

(In formula (10), $R^8$ and $R^9$ may be the same or different and each represents hydrogen, a C1-10 monovalent hydrocarbon group or a C2-20 alkoxyalkyl group, $R^{10}$ represents C2-5 alkylene, a total C2-5 substituted alkylene group having an alkyl group as a substituent, or a total C4-10 substituted alkylene group having an alkoxyalkyl group as a substituent, r represents an integer of 0-20, and $R^{13}$ represents a C1-10 monovalent hydrocarbon group), and at least one of $R^8$-$R^{11}$ is a group represented by formula (13).]

In formula (9), $R^4$-$R^7$ each represent hydrogen, a C1-10 monovalent hydrocarbon group or a group represented by formula (10), and specific C1-10 monovalent hydrocarbon groups include C1-10 straight-chain or branched alkyl, C2-10 straight-chain or branched alkenyl, C5-10 cycloalkyl or alkylcycloalkyl, C6-10 aryl or alkylaryl and C7-10 arylalkyl groups. Preferred among these monovalent hydrocarbon groups are ≤C6 monovalent hydrocarbon and especially ≤C3 alkyl groups, and specifically methyl, ethyl, n-propyl and isopropyl.

In formula (10), $R^8$ and $R^9$ each represent hydrogen, a C1-10 monovalent hydrocarbon group or a C2-20 alkoxyalkyl group, with ≤C3 alkyl groups or ≤C6 alkoxyalkyl groups being preferred.

In formula (10), $R^{10}$ represents C2-5 alkylene, a total C2-5 substituted alkylene group having an alkyl group as a substituent, or a total C4-10 substituted alkylene group having an alkoxyalkyl group as a substituent, and preferably it represents C2-4 alkylene or a total ≤C6 substituted ethylene group.

Also in formula (10), $R^{11}$ represents a C1-10 monovalent hydrocarbon group, where the hydrocarbon group may be, specifically, C1-10 straight-chain or branched alkyl, C2-10 straight-chain or branched alkenyl, C5-10 cycloalkyl or alkylcycloalkyl, C6-10 aryl or alkylaryl, or C7-10 arylalkyl. Of these there are preferred ≤C6 monovalent hydrocarbon groups, and especially ≤C3 alkyl groups.

In formula (9), at least one of $R^4$-$R^7$ is a group represented by formula (10). Most preferably, one of $R^4$ and $R^6$ is a group represented by formula (10) while the other of $R^4$ and $R^6$, and groups $R^5$ and $R^7$, are each hydrogen or a C1-10 monovalent hydrocarbon group.

Polyalkylene glycols having structural units represented by formula (9), that are preferably used for the invention, may be largely classified into 3 types: homopolymers composed entirely of structural units represented by formula (9); copolymers composed of 2 or more different structural units represented by formula (9) and having different structures; and copolymers composed of structural units represented by formula (9) and other structural units (for example, structural units represented by formula (11) below). Preferred examples of the aforementioned homopolymers include those having 1-200 structural units A represented by formula (9), and having hydroxyl, C1-10 acyloxy, C1-10 alkoxy or aryloxy groups as the end groups.

[Chemical Formula 3]

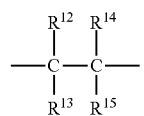

(11)

[In formula (11), $R^{12}$-$R^{15}$ may be the same or different and each represents hydrogen or a C1-3 alkyl group.]

Preferred examples of copolymers, on the other hand, include those having 1-200 each of two different structural units A and 13 represented by formula (9), or having 1-200 structural units A represented by formula (9) and 1-200 structural units C represented by formula (10), and having hydroxyl, C1-10 acyloxy, C1-10 alkoxy or aryloxy groups as the end groups.

These copolymers may have any polymerization form, such as alternating copolymerization, random copolymerization or block copolymerization of structural unit A and structural unit B (or structural unit C), or graft copolymerization with structural unit B grafted onto a main chain of structural unit A.

There are no particular restrictions on the hydroxyl value of the polyalkylene glycol, but it is preferably no greater than 100 mgKOH/g, more preferably no greater than 50 mgKOH/g, even more preferably no greater than 30 mgKOH/g and most preferably no greater than 10 mgKOH/g.

The polyalkylene glycol represented by formula (1) can be synthesized by a method known in the prior art ("Alkylene Oxide Polymers", Shibata, M., Kaibundo, Nov. 20, 1990), For example, addition polymerization may be carried out between one or more specified alkylene oxides and an alcohol ($R_1OH$: $R_1$ having the same definition as $R_1$ in formula (1) above), and the terminal hydroxyl groups etherified or esterified to obtain a polyalkylene glycol of formula (1) above. When two or more different alkylene oxides are used in the production step described above, the obtained polyalkylene glycol may be either a random copolymer or block copolymer, but it is preferably a block copolymer for more excellent oxidation stability, or preferably a random copolymer for a superior low temperature flow property.

The kinematic viscosity at 100° C. of the polyalkylene glycol represented by formula (1) is preferably 5-20 $mm^2/s$, more preferably 6-18 $mm^2/s$, even more preferably 7-16 $mm^2/s$, yet more preferably 8-15 $mm^2/s$ and most preferably 9-13 $mm^2/s$. If the kinematic viscosity at 100° C. is below the lower limit the lubricity in the copresence of refrigerants will be insufficient, and if it is greater than the upper limit, the compositional range exhibiting compatibility with refrigerants will be narrowed, potentially resulting in poor refrigerant compressor lubrication or hindered evaporator heat exchange. The kinematic viscosity at 40° C. of the polyalkylene glycol is preferably 10-200 $mm^2/s$ and more preferably 20-150 $mm^2/s$. If the kinematic viscosity at 40° C. is less than 10 $mm^2/s$ the lubricity and compressor sealability will tend to be reduced, and if it is greater than 200 $mm^2/s$, the compositional range exhibiting compatibility with refrigerants under low temperature conditions will be narrowed, potentially resulting in poor refrigerant compressor lubrication or hindered evaporator heat exchange.

The pour point of the polyalkylene glycol represented by formula (1) is preferably no higher than −10° C., and more preferably between −20 and −50° C. If a polyalkylene glycol with a pour point of above −10° C. is used, the refrigerating machine oil will tend to solidify more easily in the refrigerant circulation system at low temperature.

In the production steps for the polyalkylene glycol represented by formula (1) above, alkylene oxides such as propylene oxide will sometimes undergo secondary reactions forming unsaturated groups such as allyl groups in the molecule. When unsaturated groups are formed in the polyalkylene glycol molecule, the thermostability of the polyalkylene glycol itself is lowered and polymers are generated causing formation of sludge, or the resistance to oxidation (antioxidation) tends to be reduced, resulting in production of peroxides. Particularly when peroxides are produced, they decompose and generate carbonyl group-containing compounds, and the carbonyl group-containing compounds are a source of sludge that can cause capillary clogging.

Therefore, a polyalkylene glycol used in the first to seventh embodiments preferably has a low degree of unsaturation due to unsaturated groups and the like, and more specifically, a degree of unsaturation of no greater than 0.04 meq/g, more preferably no greater than 0.03 meq/g and even more preferably no greater than 0.02 meq/g. The peroxide number is preferably no greater than 10.0 meq/kg, more preferably no greater than 5.0 meq/kg and even more preferably no greater than 1.0 meq/kg. The carbonyl value is preferably no greater than 100 ppm by mass, more preferably no greater than 50 ppm by mass, and most preferably no greater than 20 ppm by mass.

The degree of unsaturation, peroxide number and carbonyl number according to the invention are the values measured according to the Standard Methods for the Analysis of Fats, Oils and Related Materials, established by the Japan Oil Chemists' Society. Specifically, the degree of unsaturation according to the invention is the value (meq/g) obtained by reacting Wijs solution (ICl-acetic acid solution) with a sample, allowing the reaction mixture to stand in a dark area, subsequently reducing the excess ICl to iodine, titrating the iodine portion with sodium thiosulfate and calculating the iodine value, and then converting the iodine value to vinyl equivalents; the peroxide number according to the invention is the value (meq/kg) obtained by adding potassium iodide to a sample, titrating the produced free iodine with sodium thiosulfate, and converting the free iodine to milliequivalents with respect to 1 kg of sample; and the carbonyl value according to the invention is the value (ppm by mass) obtained by allowing 2,4-dinitrophenylhydrazine to act on a sample to produce colorable quinoid ion, measuring the absorbance of the sample at 480 nm, and converting it to carbonyl content based on a predetermined calibration curve with cinnamaldehyde as the standard substance.

It is preferred for the reaction temperature to be no higher than 120° C. (more preferably no higher than 110° C.) during reaction of the propylene oxide, in order to obtain a polyalkylene glycol with a low degree of unsaturation, peroxide number and carbonyl number. When an alkali catalyst is used for production, the degree of unsaturation can be reduced by removing it using an inorganic adsorbent such as active carbon, active white clay, bentonite, dolomite or aluminosilicate. Increase in the peroxide number or carbonyl number can also be prevented by maximally avoiding contact with oxygen or by adding an antioxidant during production or use of the polyalkylene glycol.

When a refrigerating machine oil according to the first to seventh embodiments employs a polyalkylene glycol represented by formula (1), the low-temperature flow property, lubricity and stability are sufficiently high even when only the polyalkylene glycol is used alone, and it is possible to obtain excellent properties with a sufficiently wide compatibility range for unsaturated fluorinated hydrocarbon refrigerants.

Base oils or additives other than the polyalkylene glycols represented by formula (1) may also be added for the first to seventh embodiments. The polyalkylene glycol content in the refrigerating machine oil of the invention is not particularly restricted so long as the excellent properties mentioned above are not impaired, but it is preferably 50% by mass or greater, more preferably 70% by mass or greater, even more preferably 80% by mass or greater and most preferably 90% by mass or greater, based on the total amount of the refrigerating machine oil. If the content of the polyalkylene glycol represented by formula (1) is less than 50% by mass, the performance will tend to be inadequate in terms of refrigerating machine oil lubricity, refrigerant compatibility or heat and chemical stability.

There are no particular restrictions on the content of the polyalkylene glycol represented by formula (1) in a refrigerating machine oil according to the first to seventh embodiments, but for more excellent performance including lubricity, refrigerant compatibility, thermal and chemical stability and electrical insulating properties, the content is preferably at least 50% by mass, more preferably at least 70% by mass, even more preferably at least 80% by mass and most preferably at least 90% by mass, based on the total amount of the refrigerating machine oil.

Examples of polyvinyl ethers to be used for the first to seventh embodiments include polyvinyl ether-based compounds having structural units represented by the following formula (12).

[Chemical Formula 4]

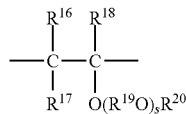

(12)

[In formula (12), $R^{16}$-$R^{18}$ may be the same or different and each represents hydrogen or a C1-8 hydrocarbon group, $R^{19}$ represents a C1-10 divalent hydrocarbon group or C2-20 divalent ether bonded oxygen-containing hydrocarbon group, $R^{20}$ represents a C1-20 hydrocarbon group, s represents an integer with an average value of 0-10, $R^{16}$-$R^{20}$ may be the same or different for each structural unit, and when the structural unit represented by formula (12) has multiple $R^{19}O$ groups, the $R^{19}O$ groups may be the same or different.]

There may also be used polyvinyl ether-based compounds comprising block copolymers or random copolymers having a structural unit represented by formula (12) and a structural unit represented by the following formula (13).

[Chemical Formula 5]

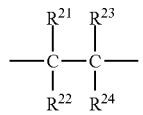

(13)

[In formula (13), $R^{21}$-$R^{24}$ may be the same or different and each represents hydrogen or a C1-20 hydrocarbon group, and $R^{21}$-$R^{24}$ may be the same or different for each structural unit.]

In formula (12), each of $R^{16}$-$R^{18}$ represents hydrogen or a C1-8 hydrocarbon group (preferably 1-4 hydrocarbon group), which may be the same or different from each other. Such hydrocarbon groups include alkyl, cycloalkyl, aryl and arylalkyl groups, but hydrogen is preferred for $R^{16}$-$R^{18}$.

The group $R^{19}$ in formula (12) represents a C1-10 (preferably 2-10) divalent hydrocarbon group or a C2-20 divalent ether bonded oxygen-containing hydrocarbon group. C1-10 divalent hydrocarbon groups include divalent aliphatic-chain hydrocarbons, alicyclic hydrocarbon groups having 2 binding sites on the alicyclic hydrocarbon, divalent aromatic hydrocarbon groups, and alkylaromatic hydrocarbon groups. C2-4 aliphatic-chain hydrocarbon groups are particularly preferred.

Specific preferred examples of C2-20 divalent ether bonded oxygen-containing hydrocarbon groups include methoxymethylene, methoxyethylene, methoxymethylethylene, 1,1-bismethoxymethylethylene, 1,2-bismethoxymethylethylene, ethoxymethylethylene, (2-methoxyethoxy)methylethylene and (1-methyl-2-methoxy)methylethylene. The symbol s in formula (15) represents the number of repeating $R^{19}O$ groups, and its average value is in the range of 0-10 and preferably 0-5. When multiple $R^{19}O$ groups are present in the same structural unit, the $R^{19}O$ groups may be the same or different.

The group $R^{20}$ in formula (12) represents a C1-20 and preferably C1-10 hydrocarbon group, where the hydrocarbon group may be alkyl, cycloalkyl, aryl, arylalkyl or the like. The $R^{22}$-$R^{26}$ groups may be the same or different for each structural unit.

When the polyvinyl ether is a homopolymer composed entirely of structural units represented by formula (12), the carbon/oxygen atomic ratio is preferably in the range of 4.2-7.0. If the atomic ratio is less than 4.2 the hygroscopicity will tend to be excessively increased, and if it is greater than 7.0 the compatibility with the working medium will tend to be reduced.

In formula (13), $R^{21}$-$R^{24}$ may be the same or different and each represents hydrogen or a C1-20 hydrocarbon group. C1-20 hydrocarbon groups include the hydrocarbon groups mentioned above for $R^{20}$ in formula (12).

The $R^{21}$-$R^{24}$ groups may be the same or different for each structural unit.

When the polyvinyl ether of the invention is a block copolymer or random copolymer comprising a structural unit represented by formula (12) and a structural unit represented by formula (13), the carbon/oxygen atom ratio is preferably in the range of 4.2-7.0. If the atomic ratio is less than 4.2 the hygroscopicity will tend to be excessively increased, and if it is greater than 7.0 the compatibility with the working medium will tend to be reduced.

According to the invention, it is also possible to use a mixture of a homopolymer composed entirely of a structural unit represented by formula (12), with a block copolymer or random copolymer comprising a structural unit represented by formula (12) and a structural unit represented by formula (13). The homopolymer and copolymer may be produced, respectively, by polymerization of their corresponding vinyl ether-based monomers, and by copolymerization of, corresponding hydrocarbon monomers having olefinic double bonds and vinyl ether-based monomers.

The polyvinyl ether used for the invention preferably has at least one of the terminal structures represented by the following formula (14) or (15), with the other having a structure represented by the following formula (16) or (17); or has a structure with one end represented by formula (14) or (15) and the other represented by the following formula (18).

[Chemical Formula 6]

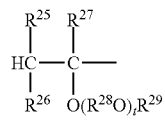

(14)

[In formula (14), $R^{25}$-$R^{27}$ may be the same or different and each represents hydrogen or a C1-8 hydrocarbon group, $R^{28}$ represents a C1-10 divalent hydrocarbon group or C2-20 divalent ether bonded oxygen-containing hydrocarbon group, $R^{29}$ represents a C1-20 hydrocarbon group, t represents an integer with an average value of 0-10, and when the end structure represented by formula (14) has multiple $R^{28}O$ groups, the $R^{28}O$ groups may be the same or different.]

[Chemical Formula 7]

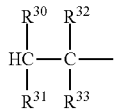

(15)

[In formula (15), $R^{30}$-$R^{33}$ may be the same or different and each represents hydrogen or a C1-20 hydrocarbon group.]

[Chemical Formula 8]

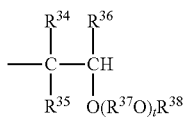

(16)

[In formula (16), $R^{34}$-$R^{36}$ may be the same or different and each represents hydrogen or a C1-8 hydrocarbon group, $R^{37}$ represents a C1-10 divalent hydrocarbon group or C2-20 divalent ether bonded oxygen-containing hydrocarbon group, $R^{38}$ represents a C1-20 hydrocarbon group, t represents an integer with an average value of 0-10, and when the end structure represented by formula (16) has multiple $R^{37}O$ groups, the $R^{37}O$ groups may be the same or different.]

[Chemical Formula 9]

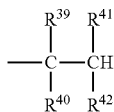

(17)

[In formula (17), $R^{39}$-$R^{42}$ may be the same or different and each represents hydrogen or a C1-20 hydrocarbon group.]

[Chemical Formula 10]

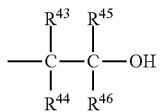

(18)

[In formula (18), $R^{43}$-$R^{46}$ may be the same or different and each represents hydrogen or a C1-8 hydrocarbon group.]

Particularly preferred among these polyvinyl ethers are the following.
(i) Those having a structure wherein one end is represented by formula (14) or (15) and the other is represented by formula (16) or (17), all of $R^{16}$-$R^{18}$ in formula (12) are hydrogen, s is an integer of 0-4, $R^{19}$ is a C2-4 divalent hydrocarbon group, and $R^{20}$ is a C1-20 hydrocarbon group;
(ii) Those having only a structural unit represented by formula (12), and having a structure wherein one end is represented by formula (14) and the other is represented by formula (15), all of $R^{16}$-$R^{18}$ in formula (12) are hydrogen, s is an integer of 0-4, $R^{19}$ is a C2-4 divalent hydrocarbon group, and $R^{20}$ is a C1-20 hydrocarbon group;
(iii) Those having a structure wherein one end is represented by formula (14) or (15) and the other is represented by formula (16), all of $R^{16}$-$R^{18}$ in formula (12) are hydrogen, s is an integer of 0-4, $R^{19}$ is a C2-4 divalent hydrocarbon group, and $R^{20}$ is a C1-20 hydrocarbon group;
(iv) Those having only a structural unit represented by formula (12), and having a structure wherein one end is represented by formula (14) and the other is represented by formula (17), all of $R^{16}$-$R^{18}$ in formula (12) are hydrogen, s is an integer of 0-4, $R^{19}$ is a C2-4 divalent hydrocarbon group, and $R^{20}$ is a C1-20 hydrocarbon group.

According to the first to seventh embodiments, there may also be used a polyvinyl ether-based compound having a structural unit represented by formula (15), and having a structure wherein one end is represented by formula (17) and the other end is represented by the following formula (19).

[Chemical Formula 11]

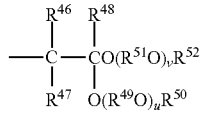

(19)

[In formula (19), $R^{46}$-$R^{48}$ may be the same or different and each represents hydrogen or a C1-8 hydrocarbon group, $R^{49}$ and $R^{51}$ may be the same or different and each represents a C2-10 divalent hydrocarbon group, $R^{50}$ and $R^{52}$ may be the same or different and each represents a C1-10 hydrocarbon group, u and v may be the same or different and each represents an integer with an average value of 0-10, and when the end structure represented by formula (19) has multiple $R^{49}O$ groups or $R^{51}O$ groups, the $R^{49}O$ or $R^{51}O$ groups may be the same or different.]

There may also be used, according to the invention, a polyvinyl ether-based compound composed of an alkylvinyl ether homopolymer or copolymer comprising a structural unit represented by the following formula (20) or (21) and having a weight-average molecular weight of 300-5000, wherein one end has a structure represented by the following formula (22) or (23).

[Chemical Formula 12]

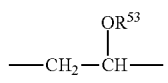

(20)

[In formula (20), $R^{53}$ represents a C1-8 hydrocarbon group.]

[Chemical Formula 13]

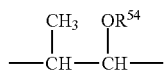

(21)

[In formula (21), $R^{54}$ represents a C1-8 hydrocarbon group.]

[Chemical Formula 14]

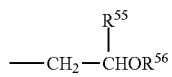
(22)

[In formula (22), $R^{55}$ represents a C1-3 alkyl group and $R^{56}$ represents a C1-8 hydrocarbon group.]

[Chemical Formula 15]

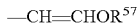
(23)

[In formula (23), $R^{57}$ represents a C1-8 hydrocarbon group.]

The kinematic viscosity at 100° C. of the polyvinyl ether is preferably 5-20 mm²/s, more preferably 6-18 mm²/s, even more preferably 7-16 mm²/s, yet more preferably 8-15 mm²/s and most preferably 9-13 mm²/s. If the kinematic viscosity at 100° C. is below the lower limit the lubricity in the copresence of refrigerants will be insufficient, and if it is greater than the upper limit, the compositional range exhibiting compatibility with refrigerants will be narrowed, potentially resulting in poor refrigerant compressor lubrication or hindered evaporator heat exchange. The kinematic viscosity at 40° C. of the polyvinyl ether is preferably 10-200 mm²/s and more preferably 20-150 mm²/s. If the kinematic viscosity at 40° C. is less than 10 mm²/s the lubricity and compressor sealability will tend to be reduced, and if it is greater than 200 mm²/s, the compositional range exhibiting compatibility with refrigerants under low temperature conditions will be narrowed, potentially resulting in poor refrigerant compressor lubrication or hindered evaporator heat exchange.

The pour point of the polyvinyl ether is preferably no higher than –10° C., and more preferably between –20 and –50° C. If a polyvinyl ether with a pour point of above –10° C. is used, the refrigerating machine oil will tend to solidify more easily in the refrigerant circulation system at low temperature.

In the production steps for the polyvinyl ether, secondary reactions will sometimes occur forming unsaturated groups such as allyl groups in the molecule. When unsaturated groups are formed in the polyvinyl ether molecule, the thermostability of the polyvinyl ether itself is lowered and polymers are generated causing formation of sludge, or the resistance to oxidation (antioxidation) tends to be reduced, resulting in production of peroxides. Particularly when peroxides are produced, they decompose and generate carbonyl group-containing compounds, and the carbonyl group-containing compounds are a source of sludge that can cause capillary clogging.

Therefore, the polyvinyl ether preferably has a low degree of unsaturation due to unsaturated groups and the like, and more specifically, a degree of unsaturation of no greater than 0.04 meq/g, more preferably no greater than 0.03 meq/g and even more preferably no greater than 0.02 meq/g. The peroxide number is preferably no greater than 10.0 meq/kg, more preferably no greater than 5.0 meq/kg and even more preferably no greater than 1.0 meq/kg. The carbonyl value is preferably no greater than 100 ppm by mass, more preferably no greater than 50 ppm by mass, and most preferably no greater than 20 ppm by mass.

There are no particular restrictions on the hydroxyl value of the polyvinyl ether, but it is preferably 10 mgKOH/g, more preferably 5 mgKOH/g and even more preferably 3 mgKOH/g.

The polyvinyl ether content in the refrigerating machine oil and the working fluid composition for a refrigerating machine according to the first to seventh embodiments is not particularly restricted so long as the excellent properties mentioned above are not impaired, but it is preferably 50% by mass or greater, more preferably 70% by mass or greater, even more preferably 80% by mass or greater and most preferably 90% by mass or greater, based on the total amount of the refrigerating machine oil. If the content of the polyvinyl ether represented by formula (12) is less than 50% by mass, the performance will tend to be inadequate in terms of refrigerating machine oil lubricity, refrigerant compatibility or heat and chemical stability.

In the refrigerating machine oil and the working fluid composition for a refrigerating machine according to the first to seventh embodiments, the base oil may be composed entirely of an ether-based compound, or it may further contain base oils other than ether-based compounds.

Base oils other than ether-based compounds that may be used include mineral oils, hydrocarbon-based oils such as an olefin polymers, naphthalene compounds and alkylbenzenes, and oxygen-containing synthetic oils including esteric base oils (monoesters, diesters, polyol esters and the like), ketones, silicones and polysiloxanes. Polyol esters are preferably used among the aforementioned oxygen-containing synthetic oils.

The additives in the refrigerating machine oil and working fluid composition for a refrigerating machine according to the first to seventh embodiments will now be explained. In the explanation which follows, the additive contents are given based on the total amount of the refrigerating machine oil, and the contents of these components in the refrigerator fluid composition are preferably selected to be within the preferred ranges specified below, based on the total amount of the refrigerating machine oil composition.

Acidic phosphoric acid ester amine salts include amine salts of acidic phosphoric acid esters and C1-24 and preferably C5-18 primary to tertiary straight-chain or branched alkyl group amines.

Acidic phosphoric acid esters to compose the amine salt of an acidic phosphoric acid ester include monobutyl acid phosphate, monopentyl acid phosphate, monohexyl acid phosphate, monoheptyl acid phosphate, monooctyl acid phosphate, mononony1 acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate and dioleyl acid phosphate.

Also, amines to compose the amine salt of an acidic phosphoric acid ester include straight-chain and branched amines such as methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, oleylamine, dimethylamine, diethylamine, dipropylamine, dibutylamine, dipentylamine, dihexylamine, diheptylamine, dioctylamine, dinonylamine, didecylamine, diundecylamine, didodecylamine, ditridecylamine, ditetradecylamine, dipentadecylamine, dihexadecylamine, diheptadecylamine, dioctadecylamine, dioleylamine, trimethylamine, triethylamine, tripropylamine, tributylamine, tripentylamine, trihexylamine, triheptylamine, trioctylamine, trinonylamine, tridecylamine, triundecylamine, tridodecylamine, tritridecylamine, tritetradecylamine, tripentadecylamine, trihexadecylamine, triheptadecylamine, trioctadecylamine and trioleylamine. The amine may be a simple compound or a mixture of two or more different compounds.

There are no particular restrictions on the content of the amine salt of an acidic phosphoric acid ester in the refrigerating machine oil and the working fluid composition for a refrigerating machine according to the first, second and seventh embodiments, but it is preferably 0.01-5.0% by mass and more preferably 0.02-3.0% by mass, based on the total amount of the refrigerating machine oil (the total amount of the base oil and all of the additives).

Also, the content of the amine salt of an acidic phosphoric acid ester in the refrigerating machine oil and the working fluid composition for a refrigerating machine according to the third and fifth embodiments is greater than 0 and less than 400 ppm by mass, preferably 100-350 ppm by mass and more preferably 200-300 ppm by mass, based on the total amount of the refrigerating machine oil (the total amount of the base oil and all of the additives). If the content of the amine salt of an acidic phosphoric acid ester is less than 400 ppm by mass, it will be possible to achieve a satisfactory balance between chemical stability and lubricity.

Also, the content of the amine salt of an acidic phosphoric acid ester in the refrigerating machine oil and the working fluid composition for a refrigerating machine according to the fourth and sixth embodiments is 400 ppm by mass or greater, preferably 450-10,000 ppm by mass and more preferably 500-5000 ppm by mass, based on the total amount of the refrigerating machine oil (the total amount of the base oil and all of the additives). If the content of the amine salt of an acidic phosphoric acid ester is at least 400 ppm by mass, it will be possible to ensure excellent lubricity.

For the first to seventh embodiments, the amine salt of an acidic phosphoric acid ester may be of a single type or 2 or more types.

Amine-based antioxidants to be used for the first, fifth and sixth embodiments will now be explained in detail. For the second, third, fourth and seventh embodiments as well, an amine-based antioxidant is preferably added to the refrigerating machine oil and the working fluid composition for a refrigerating machine.

Amine-based antioxidants include phenyl-α-naphthylamines represented by formula (24) and p,p'-dialkylated diphenylamines represented by formula (25), shown below.

[Chemical Formula 16]

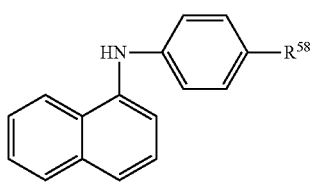

(24)

[Chemical Formula 17]

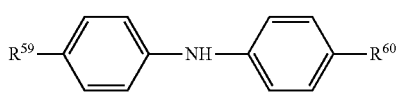

(25)

In formula (24), $R^{58}$ represents hydrogen or a C1-16 alkyl group. In formula (25), $R^{59}$ and $R^{60}$ each separately represent a C1-16 alkyl group.

When $R^{58}$ in a compound represented by formula (24) is an alkyl group, preferably $R^{58}$ is a C8-16 branched alkyl group, and more preferably a C8-16 branched alkyl group derived from a C3 or C4 olefin oligomer, since this will allow a superior anti-sludge effect to be obtained. Specific C3 or C4 olefins include propylene, 1-butene, 2-butene and isobutylene, with propylene or isobutylene being preferred in order to obtain a superior anti-sludge effect. For an even greater anti-sludge effect, $R^{58}$ is more preferably a branched octyl group derived from an isobutylene dimer, a branched nonyl group derived from a propylene trimer, a branched dodecyl group derived from an isobutylene trimer, a branched dodecyl group derived from a propylene tetramer or a branched pentadecyl group derived from a propylene pentamer, it is even more preferably a branched octyl group derived from an isobutylene dime; a branched dodecyl group derived from an isobutylene trimer or a branched dodecyl group derived from a propylene tetramer, and it is most preferably a branched dodecyl group.

Also, in order to obtain an even greater anti-sludge effect, $R^{59}$ and $R^{60}$ in a p,p'-dialkyldiphenylamine represented by formula (25) are each preferably a C3-16 branched alkyl group, and more preferably a C3-16 branched alkyl group derived from a C3 or C4 olefin or its oligomer. Specific C3 or C4 olefins include propylene, 1-butene, 2-butene and isobutylene, with propylene or isobutylene being preferred in order to obtain an even greater anti-sludge effect.

Also, in order to obtain an even greater anti-oxidant effect, $R^{59}$ or $R^{60}$ is most preferably a tert-butyl group derived from isobutylene, or a branched octyl group derived from an isobutylene dimer.

The p,p'-dialkyldiphenylamine represented by formula (25) may be a commercially available product or a synthesized product. A synthesized product can be easily synthesized by reaction between a C1-16 alkyl halide compound and a diphenylamine or between a C2-16 olefin or its oligomer and a diphenylamine, using a Friedel-Crafts catalyst, similar to a phenyl-α-naphthylamine represented by formula (24), and any synthesis method may be used.

The upper limit for the amine-based antioxidant content is also preferably 2% by mass, more preferably 1.5% by mass and even more preferably 1% by mass based on the total amount of the composition. The content preferably does not exceed 2% by mass, as this can lead to sludge generation. On the other hand, the lower limit for the amine-based antioxidant content is preferably 0.001% by mass, more preferably 0.05% by mass and even more preferably 0.1% by mass based on the total amount of the composition. If the antioxidant content is not at least 0.001% by mass, the anti-oxidant effect will be undesirably insufficient.

Metal inactivating agents to be used for the second, fifth and sixth embodiments will now be described in detail. For the first, third, fourth and seventh embodiments as well, a metal inactivating agent is preferably added to the refrigerating machine oil and the working fluid composition for a refrigerating machine.

Benzotriazole or its derivatives may be suitably used as metal inactivating agents.

Benzotriazole is a compound represented by the following formula (26).

[Chemical Formula 18]

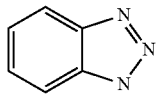
(26)

Examples of benzotriazole derivatives include alkylbenzotriazoles represented by formula (27) and (alkyl)aminoalkylbenzotriazoles represented by formula (28), shown below.

[Chemical Formula 19]

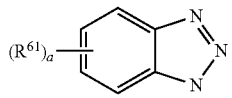
(27)

[Chemical Formula 20]

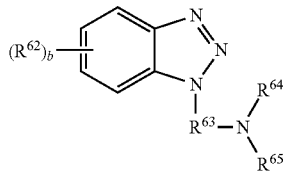
(28)

In formula (27), $R^{61}$ represents a C1-4 straight-chain or branched alkyl group and preferably methyl or ethyl, and "a" represents 1-3 and preferably 1 or 2. Examples for $R^{61}$ include methyl, ethyl, n-propyl, isopropyl, n-butyl, isobutyl, sec-butyl and tert-butyl. Particularly preferred as alkylbenzotriazoles represented by formula (27), from the viewpoint of excellent anti-oxidant properties, are compounds wherein $R^{61}$ is methyl or ethyl and "a" is 1 or 2, examples of which include methylbenzotriazole (tolyltriazole), dimethylbenzotriazole, ethylbenzotriazole, ethylmethylbenzotriazole, diethylbenzotriazole, and mixtures of the foregoing.

In formula (28), $R^{62}$ represents a C1-4 straight-chain or branched alkyl group and preferably methyl or ethyl, $R^{63}$ represents a methylene or ethylene group, $R^{64}$ and $R^{65}$ are the same or different groups and each represents hydrogen or a C1-18 straight-chain or branched alkyl group, and preferably a C1-12 straight-chain or branched alkyl group, and b represents 0-3 and preferably 0 or 1.

Examples for $R^{62}$ include methyl, ethyl, n-propyl, isopropyl, n-butyl, isobutyl, sec-butyl and tert-butyl. Groups for $R^{64}$ and $R^{65}$ include hydrogen and alkyl groups such as methyl, ethyl, propyl, isopropyl, n-butyl, isobutyl, sec-butyl, tert-butyl, pentyl, hexyl, heptyl, octyl, nonyl, decyl, undecyl, dodecyl, tridecyl, tetradecyl, pentadecyl, hexadecyl, heptadecyl and octadecyl. $R^{64}$ and $R^{65}$ may be the same or different.

Preferred as (alkyl)aminobenzotriazoles represented by formula (28), especially from the viewpoint of excellent anti-oxidation properties, are dialkylaminoalkylbenzotriazoles or dialkylaminoalkyltolyltriazoles, wherein $R^{62}$ is methyl, b is 0 or 1, $R^{63}$ is a methylene or ethylene group, and $R^{64}$ and $R^{65}$ are C1-12 straight-chain or branched alkyl groups, or mixtures thereof.

Examples of such dialkylaminoalkylbenzotriazoles include dimethylaminomethylbenzotriazole, diethylaminomethylbenzotriazole, dipropylaminomethylbenzotriazole, dibutylaminomethylbenzotriazole, dipentylaminomethylbenzotriazole, dihexylaminomethylbenzotriazole, diheptylaminomethylbenzotriazole, dioctylaminomethylbenzotriazole, N,N-bis(2-ethylhexyl)-methylbenzotriazole, dinonylaminomethylbenzotriazole, didecylaminomethylbenzotriazole, diundecylaminomethylbenzotriazole, didodecylaminomethylbenzotriazole; dimethylaminoethylbenzotriazole, diethylaminoethylbenzotriazole, dipropylaminoethylbenzotriazole, dibutylaminoethylbenzotriazole, dipentylaminoethylbenzotriazole, dihexylaminoethylbenzotriazole, diheptylaminoethylbenzotriazole, dioctylaminoethylbenzotriazole, dinonylaminoethylbenzotriazole, didecylaminoethylbenzotriazole, diundecylaminoethylbenzotriazole, didodecylaminoethylbenzotriazole; dimethylaminomethyltolyltriazole, diethylaminomethyltolyltriazole, dipropylaminomethyltolyltriazole, dibutylaminomethyltolyltriazole, dipentylaminomethyltolyltriazole, dihexylaminomethyltolyltriazole, diheptylaminomethyltolyltriazole, dioctylaminomethyltolyltriazole, dinonylaminomethyltolyltriazole, didecylaminomethyltolyltriazole, diundecylaminomethyltolyltriazole, didodecylaminomethyltolyltriazole; dimethylaminoethyltolyltriazole, diethylaminoethyltolyltriazole, dipropylaminoethyltolyltriazole, dibutylaminoethyltolyltriazole, dipentylaminoethyltolyltriazole, dihexylaminoethyltolyltriazole, diheptylaminoethyltolyltriazole, dioctylaminoethyltolyltriazole, dinonylaminoethyltolyltriazole, didecylaminoethyltolyltriazole, diundecylaminoethyltolyltriazole, didodecylaminoethyltolyltriazole; and mixtures of the foregoing.

There are no particular restrictions on the metal inactivating agent content in the refrigerating machine oil and the working fluid composition for a refrigerating machine, but is usually preferred to be 0.001-1.0% by mass and more preferably 0.005-0.5% by mass, based on the total amount of the refrigerating machine oil. If the metal inactivating agent content is less than 0.001% by mass the effect of addition may be insufficient, and if it exceeds 1.0% by mass the effect of addition will not be commensurate with the content, which is economically disadvantageous.

Alicyclic epoxy compounds to be used for the third, fourth, fifth, sixth and seventh embodiments will now be described in detail. For the first and second embodiments as well, it is preferred to add an alicyclic epoxy compound to the refrigerating machine oil and the working fluid composition for a refrigerating machine.

Alicyclic epoxy compounds include compounds wherein the carbon atoms composing the epoxy group directly form an alicyclic ring, as the compounds represented by the following formula (29).

[Chemical Formula 21]

(29)

Examples of alicyclic epoxy compounds include 1,2-epoxycyclohexane, 1,2-epoxycyclopentane, 3,4-epoxycyclohexylmethyl-3,4-epoxycyclohexane carboxylate, bis(3,4-epoxycyclohexylmethyl)adipate, exo-2,3-epoxynorbornane, bis(3,4-epoxy-6-methylcyclohexylmethyl)adipate, 2-(7-oxabicyclo[4.1.0] hept-3-yl)-spiro(1,3-dioxane-5,3'-[7] oxabicyclo[4.1.0]heptane, 4-(1'-methylepoxyethyl)-1,2-epoxy-2-methylcyclohexane and 4-epoxyethyl-1,2-epoxycyclohexane.

Examples of epoxidated fatty acid monoesters include epoxidated esters of C12-20 fatty acids and C1-8 alcohols or phenols or alkylphenols. Most preferred are butyl, hexyl, benzyl, cyclohexyl, methoxyethyl, octyl, phenyl and butylphenyl esters of epoxystearic acid. An alicyclic epoxy compound may be used, or two or more may be used in combination.

There are no particular restrictions on the content of the alicyclic epoxy compound in the refrigerating machine oil and the working fluid composition for a refrigerating machine, but usually it is preferably 0.01-6.0% by mass, more preferably 0.05-5.0% by mass, even more preferably 0.10-4.0% by mass, yet more preferably 0.15-3.0% by mass and most preferably 0.20-2.0% by mass, based on the total amount of the refrigerating machine oil. If the alicyclic epoxy compound content is less than 0.01% by mass the improving effect on thermal and hydrolytic stability by addition of the alicyclic epoxy compound may not be sufficient, while if it is greater than 6.0% by mass the insoluble components may be deposited, and therefore neither extreme is preferred.

Epoxy compounds other than alicyclic epoxy compounds may also be used in the refrigerating machine oil and the working fluid composition for a refrigerating machine according to the first to seventh embodiments, but it is preferable to either use an alicyclic epoxy compound, or to use an alicyclic epoxy compound in combination with an epoxy compound other than an alicyclic epoxy compound. Preferred epoxy compounds other than alicyclic epoxy compounds include phenyl glycidyl ether-type epoxy compounds, glycidyl ester-type epoxy compounds and epoxidated fatty acid monoesters, with glycidyl ester-type epoxy compounds being more preferred.

Conventionally known refrigerating machine oil additives may be included as necessary, in order to further increase the performance of the refrigerating machine oil and the working fluid composition for a refrigerating machine according to the first to seventh embodiments. Examples of such additives include phenol-based antioxidants such as di-tert-butyl-p-cresol and bisphenol A, anti-wear agents such as zinc dithiophosphate and phosphorus compounds other than those of the present application, extreme-pressure agents such as chlorinated paraffins and sulfur compounds, oiliness agents such as fatty acids, antifoaming agents such as silicone-based compounds, viscosity index improvers, pour point depressants, detergent dispersants, and the like. Such additives may be used alone or in combinations of two or more. There are no particular restrictions on the content of such additives, but it is preferably no greater than 10% by mass and more preferably no greater than 5% by mass based on the total amount of the refrigerating machine oil.

The kinematic viscosity of the refrigerating machine oil according to the first to seventh embodiments is not particularly restricted, but the kinematic viscosity at 40° C. is preferably 3-1000 mm$^2$/s, more preferably 4-500 mm$^2$/s and most preferably 5-400 mm$^2$/s. The kinematic viscosity at 100° C. is preferably 1-100 mm$^2$/s and more preferably 2-50 mm$^2$/s.

The moisture content of the refrigerating machine oil according to the seventh embodiment is 300-10,000 ppm by mass, preferably 350-8000 ppm by mass and more preferably 400-6000 ppm by mass based on the total amount of the refrigerating machine oil. If the moisture content of the refrigerating machine oil is within this specified range, it will be possible to increase the stability of the refrigerating machine oil composition under unsaturated fluorinated hydrocarbon refrigerant atmospheres. While the reason for this is not fully understood, it is believed that the alicyclic epoxy compound takes up water, thereby stabilizing trace decomposition products from the unsaturated fluorinated hydrocarbon refrigerant.

The moisture content of the refrigerating machine oil of the first to sixth embodiments is not particularly restricted but is preferably no greater than 500 ppm by mass, more preferably no greater than 300 ppm by mass and most preferably no greater than 200 ppm by mass, based on the total amount of the refrigerating machine oil. Particularly when the refrigerating machine oil and the working fluid composition for a refrigerating machine according to the first to sixth embodiments are to be used in closed refrigerating machines, a lower moisture content is desired from the viewpoint of effect on the thermal and chemical stability and electrical insulating properties of the refrigerating machine oil.

The acid value of the refrigerating machine oil of the first to seventh embodiments is also not particularly restricted, but in order to prevent corrosion of metals used in the refrigerating machine or pipings, and in order to prevent decomposition of the ester in the refrigerating machine oil of the invention, it is preferably no greater than 0.1 mgKOH/g and more preferably no greater than 0.05 mgKOH/g. According to the invention, the acid value is the value measured based on JIS K2501, "Petroleum Products And Lubricant Oils—Neutralization Value Test Method".

The ash content of the refrigerating machine oil of the first to seventh embodiments is not particularly restricted, but in order to increase the thermal and chemical stability of the refrigerating machine oil of the invention and inhibit generation of sludge, it is preferably no greater than 100 ppm by mass and more preferably no greater than 50 ppm by mass. According to the invention, the ash content is the value measured based on JIS K2272, "Crude Oil/Petroleum Product Ash Content and Sulfated Ash Content Test Method".

The refrigerating machine oil of the first to seventh embodiments is to be used together with an unsaturated fluorinated hydrocarbon refrigerant, and the working fluid composition for a refrigerating machine of the first to seventh embodiments comprises an unsaturated fluorinated hydrocarbon refrigerant.

The unsaturated fluorinated hydrocarbon refrigerant is preferably an unsaturated fluorinated hydrocarbon with 3-5 fluorine atoms, and it is preferably one or a mixture of 2 or more from among 1,2,3,3,3-pentafluoropropene (HFO-1225ye), 1,3,3,3-tetrafluoropropene HFO-1234ze), 2,3,3,3-tetrafluoropropene (HFO-1234yf), 1,2,3,3-tetrafluoropropene (HFO-1234ye) and 3,3,3-trifluoropropene (HFO-1243zf). From the viewpoint of refrigerant properties, it is preferred to use one or more selected from among HFO-1225ye, HFO-1234ze and HFO-1234yf.

The refrigerant used for the first to seventh embodiments may also be a refrigerant mixture comprising an unsaturated fluorinated hydrocarbon refrigerant and another refrigerant. Other refrigerants include HFC refrigerants, fluorinated ether-based refrigerants such as perfluoroethers, and natural refrigerants including dimethyl ether, ammonia, hydrocarbons and the like.

HFC refrigerants include C1-3 and preferably C1-2 hydrofluorocarbons. Specific examples include difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa) and 1,1,1,3,3-pentafluorobutane (HFC-365 mfc), as well as mixtures of two or more thereof. These refrigerants may be appropriately selected depending on the purpose of use and the required performance, but preferred examples include HFC-32 alone; HFC-23 alone; HFC-134a alone; HFC-125 alone; HFC-134a/HFC-32=60-80% by mass/40-20% by mass mixture; HFC-32/HFC-125=40-70% by mass/60-30% by mass mixture: HFC-125/HFC-143a=40-60% by mass/60-40% by mass mixture; HFC-134a/HFC-32/HFC-125=60% by mass/30% by mass/10% by mass mixture; HFC-134a/HFC-32/HFC-125=40-70% by mass/15-35% by mass/5-40% by mass mixture; and HFC-125/HFC-134a/HFC-143a=35-55% by mass/1-15% by mass/40-60% by mass mixture. More specifically, these include HFC-134a/HFC-32=70/30% by mass mixture; HFC-32/HFC-125=60/40% by mass mixture; HFC-32/HFC-125=50/50% by mass mixture (R410A); HFC-32/HFC-125=45/55% by mass mixture (R410B); HFC-125/HFC-143a=50/50% by mass mixture (R507C); HFC-32/HFC-125/HFC-134a=30/10/60% by mass mixture; HFC-32/HFC-125/HFC-134a=23/25/52% by mass mixture (R407C); HFC-32/HFC-125/HFC-134a=25/15/60% by mass mixture (R407E); and HFC-125/HFC-134a/HFC-143a=44/4/52% by mass mixture (R404A).

As saturated hydrofluorocarbons among HFC refrigerants, there are preferred one or mixtures of two or more selected from among difluoromethane (HFC-32), pentafluoroethane (HFC-125), 1,1,2,2-tetrafluoroethane (HFC-134), 1,1,1,2-tetrafluoroethane (HFC-134a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236 fa), 1,1,1,3,3-pentafluoropropane (HFC-245fa) and 1,1,1,3,3-pentafluorobutane (HFC-365mfc), and from the viewpoint of refrigerant properties there are especially preferred HFC-32, HFC-125, HFC-134a, HFC-152a and mixtures of HFC-32 and HFC-134a.

As hydrocarbon refrigerants there are preferred C3-5 hydrocarbons, and as specific examples there may be mentioned methane, ethylene, ethane, propylene, propane, cyclopropane, normal-butane, isobutane, cyclobutane, methylcyclopropane, 2-methylbutane, normal-pentane, and mixtures of two or more of the foregoing. Preferred among these are refrigerants that are gases at 25° C., 1 atmosphere, such as propane, normal-butane, isobutane, 2-methylbutane, and mixtures thereof.

Specific examples of fluorinated ether-based refrigerants include HFE-134p, HFE-245mc, HFE-236mf, HFE-236me, HFE-338mcf, HFE-365mcf, HFE-245mf, HFE-347 mmy, HFE-347mcc, HFE-125, HFE-143m, HFE-134m, HFE-227me and the like, and these refrigerants may be appropriately selected depending on the purpose of use and the required performance.

When the refrigerant used for the first to seventh embodiments is a refrigerant mixture, the refrigerant mixture preferably contains at least one component selected from among unsaturated fluorinated hydrocarbon refrigerants (hereinafter referred to as "refrigerant (A)") and at least one component selected from among saturated hydrofluorocarbon, C3-5 hydrocarbon, dimethyl ether, carbon dioxide, bis(trifluoromethyl)sulfide and trifluoroiodomethane refrigerants (hereinafter referred to as "refrigerant (B)").

When the refrigerant used for the first to seventh embodiments is a refrigerant mixture comprising refrigerant (A) and refrigerant (B), the refrigerant mixture is preferably an azeotropic mixture, but it does not need to be an azeotropic mixture so long as it has the properties required as a refrigerant, and the mixing ratio of both components is preferably 1:99-99:1 and more preferably 5:95-95:5.

Also, when the refrigerant used for the first to seventh embodiments is a refrigerant mixture comprising refrigerant (A) and refrigerant (B), the refrigerant mixture may further contain an HFC refrigerant other than the unsaturated fluorinated hydrocarbon refrigerant or saturated hydrofluorocarbon, a fluorinated ether-based refrigerant such as a perfluoroether, or a natural refrigerant such as a hydrocarbon other than a C3-5 hydrocarbon, or ammonia.

The refrigerating machine oil of the first to seventh embodiments will usually be in the form of a refrigerator fluid composition, as a mixture of an unsaturated fluorinated hydrocarbon refrigerant or a refrigerant mixture as mentioned above, in a refrigerating air conditioner. There are no particular restrictions on the mixing proportion of the refrigerating machine oil and refrigerant in the composition, or on the mixing proportion of the refrigerating machine oil and refrigerant in the working fluid composition for a refrigerating machine according to the first to seventh embodiments, but the refrigerating machine oil content is preferably 1-500 parts by mass and more preferably 2-400 parts by mass with respect to 100 parts by mass of the refrigerant.

The refrigerating machine oil and working fluid composition for a refrigerating machine of the first to seventh embodiments is preferably used in an air conditioner or refrigerator with a reciprocating or rotating closed compressor, or in an open or closed automobile air conditioner. The refrigerating machine oil and working fluid composition for a refrigerating machine according to the first to seventh embodiments may also be suitably used in cooling devices of dehumidifiers, hot water suppliers, freezers, freezing/refrigerating warehouses, automatic vending machines, showcases, chemical plants and the like. The refrigerating machine oil and working fluid composition for a refrigerating machine according to the first to seventh embodiments may also be suitably used in devices with centrifugal compressors.

EXAMPLES

The present invention will now be explained in greater detail based on examples and comparative examples, with the understanding that these examples are in no way limitative on the invention.

Examples 1-1 to 1-31, Comparative Examples 1-1 to 1-9

For Examples 1-1 to 1-31 and Comparative Examples 1-1 to 1-9, refrigerating machine oils were prepared using the base oils and additives listed below. The properties of the obtained refrigerating machine oils are shown in Tables 1 to 4.

(Base Oils)
Base oil 1: Polyethylenepropyleneglycol monomethyl ether
Base oil 2: Polypropyleneglycol dimethyl ether
Base oil 3: Polyvinyl ether
(Additives)
A1: Oleylamine salt of di(2-ethylhexyl)acid phosphate
A2: 2-Ethylhexylamine salt of dioctyl acid phosphate
A3: Mono(C11-C14 mixed alkylamine salt of dihexyl acid phosphate
B1: Dioctyldiphenylamine
B2: Dinonyldiphenylamine
B3: Octylphenyl-α-naphthylamine
C1: Benzotriazole
C2: N,N-bis(2-Ethylhexyl)-methylbenzotriazole
D1: 1,2-Epoxycyclohexane
D2: 3,4-Epoxycyclohexylmethyl-3,4-epoxycyclohexane carboxylate D3: 4-(1'-Methylepoxyethyl)-1,2-epoxy-2-methylcyclohexane
a1: Tricresyl phosphate
b1: 2,6-di-t-Butyl-p-cresol
d1: p-t-Butylphenyl glycidyl ether
d2: Glycidyl-2,2'-dimethyl octanoate
d3: 1,2-Epoxyoctadecane Each of the refrigerating machine oils obtained in Examples 1-1 to 1-31 and Comparative Examples 1-1 to 1-9 was subjected to an evaluation test in the following manner.

(Thermal/Chemical Stability Evaluation)

A test was conducted by filling 30 g of a sample oil prepared to a moisture content of no greater than 100 ppm by mass (initial color tone: L0.5) and 30 g of 2,3,3,3-tetrafluoropropene into a 200 ml stainless steel autoclave together with a catalyst (iron, copper and aluminum wires), and then heating this to 175° C. and storing for 2 weeks. Following the test, the refrigerating machine oil composition color tone, acid value and fluorine ion content and changes in catalyst outer appearance were measured. The obtained results are shown in Tables 1 to 4.

(Evaluation of Lubricity)

A test was conducted for 1 hour according to ASTM D2670 while blowing 2,3,3,3-tetrafluoropropene into the sample oil at 10 L/h, with an oil temperature of 80° C. and a load of 250 LB, and the pin wear after the test was measured. The obtained results are shown in Tables 1 to 4.

TABLE 1

|  |  | Example 1-1 | Example 1-2 | Example 1-3 | Example 1-4 | Example 1-5 |
|---|---|---|---|---|---|---|
| Composition (% by mass) | Base oil 1 | 99.87 | 99.85 | 99.8 | 99.65 | 99.9 |
|  | Base oil 2 | — | — | — | — | — |
|  | Base oil 3 | — | — | — | — | — |
|  | A1 | 0.03 | 0.05 | 0.1 | 0.05 | 0.05 |
|  | A2 | — | — | — | — | — |
|  | A3 | — | — | — | — | — |
|  | B1 | 0.1 | 0.1 | 0.1 | 0.3 | 0.05 |
|  | B2 | — | — | — | — | — |
|  | B3 | — | — | — | — | — |
|  | C1 | — | — | — | — | — |
|  | C2 | — | — | — | — | — |
|  | D1 | — | — | — | — | — |
|  | D2 | — | — | — | — | — |
|  | D3 | — | — | — | — | — |
|  | a1 | — | — | — | — | — |
|  | b1 | — | — | — | — | — |
|  | d1 | — | — | — | — | — |
|  | d2 | — | — | — | — | — |
|  | d3 | — | — | — | — | — |
| Stability | Acid value (mgKOH/g) | 0.08 | 0.07 | 0.07 | 0.05 | 0.12 |
|  | F content (ppm) | 21 | 19 | 18 | 12 | 19 |
|  | Color tone (ASTM color) | L0.5 | L0.5 | L0.5 | L0.5 | L0.5 |
|  | Catalyst appearance | Reduced gloss | Reduced gloss | Reduced gloss | Reduced gloss | Reduced gloss |
| Lubricity | Pin wear (mg) | 2.8 | 2.1 | 1.9 | 2.5 | 2.3 |

|  |  | Example 1-6 | Example 1-7 | Example 1-8 | Example 1-9 | Example 1-10 |
|---|---|---|---|---|---|---|
| Composition (% by mass) | Base oil 1 | 99.85 | 99.85 | 99.87 | 99.85 | 99.8 |
|  | Base oil 2 | — | — | — | — | — |
|  | Base oil 3 | — | — | — | — | — |
|  | A1 | 0.05 | 0.05 | — | — | — |
|  | A2 | — | — | 0.03 | 0.05 | 0.1 |
|  | A3 | — | — | — | — | — |
|  | B1 | — | — | 0.1 | 0.1 | 0.1 |
|  | B2 | 0.1 | — | — | — | — |
|  | B3 | — | 0.1 | — | — | — |
|  | C1 | — | — | — | — | — |
|  | C2 | — | — | — | — | — |
|  | D1 | — | — | — | — | — |
|  | D2 | — | — | — | — | — |
|  | D3 | — | — | — | — | — |
|  | a1 | — | — | — | — | — |
|  | b1 | — | — | — | — | — |
|  | d1 | — | — | — | — | — |
|  | d2 | — | — | — | — | — |
|  | d3 | — | — | — | — | — |
| Stability | Acid value (mgKOH/g) | 0.10 | 0.09 | 0.09 | 0.08 | 0.07 |
|  | F content (ppm) | 15 | 14 | 17 | 16 | 12 |
|  | Color tone (ASTM color) | L0.5 | L0.5 | L0.5 | L0.5 | L0.5 |
|  | Catalyst appearance | Reduced gloss | Reduced gloss | Reduced gloss | Reduced gloss | Reduced gloss |
| Lubricity | Pin wear (mg) | 2.1 | 2.4 | 2.4 | 2.2 | 2.1 |

TABLE 2

|  |  | Example 1-11 | Example 1-12 | Example 1-13 | Example 1-14 | Example 1-15 |
|---|---|---|---|---|---|---|
| Composition (% by mass) | Base oil 1 | 99.65 | 99.9 | 99.85 | 99.85 | 99.87 |
|  | Base oil 2 | — | — | — | — | — |
|  | Base oil 3 | — | — | — | — | — |
|  | A1 | — | — | — | — | — |
|  | A2 | 0.05 | 0.05 | 0.05 | 0.05 | — |
|  | A3 | — | — | — | — | 0.03 |
|  | B1 | 0.3 | 0.05 | — | — | 0.1 |
|  | B2 | — | — | 0.1 | — | — |
|  | B3 | — | — | — | 0.1 | — |
|  | C1 | — | — | — | — | — |
|  | C2 | — | — | — | — | — |
|  | D1 | — | — | — | — | — |
|  | D2 | — | — | — | — | — |
|  | D3 | — | — | — | — | — |
|  | a1 | — | — | — | — | — |
|  | b1 | — | — | — | — | — |
|  | d1 | — | — | — | — | — |
|  | d2 | — | — | — | — | — |
|  | d3 | — | — | — | — | — |
| Stability | Acid value (mgKOH/g) | 0.06 | 0.11 | 0.09 | 0.08 | 0.10 |
|  | F content (ppm) | 11 | 18 | 14 | 15 | 19 |
|  | Color tone (ASTM color) | L0.5 | L0.5 | L0.5 | L0.5 | L0.5 |
|  | Catalyst appearance | Reduced gloss | Reduced gloss | Reduced gloss | Reduced gloss | Reduced gloss |
| Lubricity | Pin wear (mg) | 2.3 | 2.5 | 2.3 | 2.2 | 2.6 |

|  |  | Example 1-16 | Example 1-17 | Example 1-18 | Example 1-19 | Example 1-20 |
|---|---|---|---|---|---|---|
| Composition (% by mass) | Base oil 1 | 99.85 | 99.8 | 99.65 | 99.9 | 99.85 |
|  | Base oil 2 | — | — | — | — | — |
|  | Base oil 3 | — | — | — | — | — |
|  | A1 | — | — | — | — | — |
|  | A2 | — | — | — | — | — |
|  | A3 | 0.05 | 0.1 | 0.05 | 0.05 | 0.05 |
|  | B1 | 0.1 | 0.1 | 0.3 | 0.05 | — |
|  | B2 | — | — | — | — | 0.1 |
|  | B3 | — | — | — | — | — |
|  | C1 | — | — | — | — | — |
|  | C2 | — | — | — | — | — |
|  | D1 | — | — | — | — | — |
|  | D2 | — | — | — | — | — |
|  | D3 | — | — | — | — | — |
|  | a1 | — | — | — | — | — |
|  | b1 | — | — | — | — | — |
|  | d1 | — | — | — | — | — |
|  | d2 | — | — | — | — | — |
|  | d3 | — | — | — | — | — |
| Stability | Acid value (mgKOH/g) | 0.08 | 0.08 | 0.06 | 0.09 | 0.08 |
|  | F content (ppm) | 11 | 12 | 10 | 12 | 13 |
|  | Color tone (ASTM color) | L0.5 | L0.5 | L0.5 | L0.5 | L0.5 |
|  | Catalyst appearance | Reduced gloss | Reduced gloss | Reduced gloss | Reduced gloss | Reduced gloss |
| Lubricity | Pin wear (mg) | 2.5 | 2.2 | 2.4 | 2.1 | 2.2 |

TABLE 3

|  |  | Example 1-21 | Example 1-22 | Example 1-23 | Example 1-24 | Example 1-25 |
|---|---|---|---|---|---|---|
| Composition (% by mass) | Base oil 1 | 99.85 | — | — | 99.845 | 99.8 |
|  | Base oil 2 | — | 99.85 | — | — | — |
|  | Base oil 3 | — | — | 99.85 | — | — |
|  | A1 | — | 0.05 | 0.05 | 0.05 | 0.05 |
|  | A2 | — | — | — | — | — |
|  | A3 | 0.05 | — | — | — | — |
|  | B1 | — | 0.1 | 0.1 | 0.1 | 0.1 |
|  | B2 | 0.1 | — | — | — | — |
|  | B3 | — | — | — | — | — |
|  | C1 | — | — | — | 0.005 | — |
|  | C2 | — | — | — | — | 0.05 |
|  | D1 | — | — | — | — | — |
|  | D2 | — | — | — | — | — |
|  | D3 | — | — | — | — | — |

TABLE 3-continued

|  |  |  |  |  |  |  |
|---|---|---|---|---|---|---|
|  | a1 | — | — | — | — | — |
|  | b1 | — | — | — | — | — |
|  | d1 | — | — | — | — | — |
|  | d2 | — | — | — | — | — |
|  | d3 | — | — | — | — | — |
| Stability | Acid value (mgKOH/g) | 0.09 | 0.08 | 0.12 | 0.05 | 0.04 |
|  | F content (ppm) | 14 | 18 | 21 | 12 | 13 |
|  | Color tone (ASTM color) | L0.5 | L0.5 | L0.5 | L0.5 | L0.5 |
|  | Catalyst appearance | Reduced gloss | Reduced gloss | Reduced gloss | No change | No change |
| Lubricity | Pin wear (mg) | 2.2 | 2.5 | 2.4 | 2.1 | 2.5 |

|  |  | Example 1-26 | Example 1-27 | Example 1-28 | Example 1-29 | Example 1-30 | Example 1-30 |
|---|---|---|---|---|---|---|---|
| Composition (% by mass) | Base oil 1 | 98.85 | 98.85 | 98.85 | 98.85 | 98.85 | 98.85 |
|  | Base oil 2 | — | — | — | — | — | — |
|  | Base oil 3 | — | — | — | — | — | — |
|  | A1 | 0.05 | 0.05 | 0.05 | 0.05 | 0.05 | 0.05 |
|  | A2 | — | — | — | — | — | — |
|  | A3 | — | — | — | — | — | — |
|  | B1 | 0.1 | 0.1 | 0.1 | 0.1 | 0.1 | 0.1 |
|  | B2 | — | — | — | — | — | — |
|  | B3 | — | — | — | — | — | — |
|  | C1 | — | — | — | — | — | — |
|  | C2 | — | — | — | — | — | — |
|  | D1 | 1.0 | — | — | — | — | — |
|  | D2 | — | 1.0 | — | — | — | — |
|  | D3 | — | — | 1.0 | — | — | — |
|  | a1 | — | — | — | — | — | — |
|  | b1 | — | — | — | — | — | — |
|  | d1 | — | — | — | 1.0 | — | — |
|  | d2 | — | — | — | — | 1.0 | — |
|  | d3 | — | — | — | — | — | 1.0 |
| Stability | Acid value (mgKOH/g) | 0.01 | 0.01 | 0.01 | 0.02 | 0.03 | 0.02 |
|  | F content (ppm) | <1 | <1 | <1 | 2 | 4 | 2 |
|  | Color tone (ASTM color) | L0.5 | L0.5 | L0.5 | L0.5 | L0.5 | L0.5 |
|  | Catalyst appearance | No change | No change | No change | No change | No change | No change |
| Lubricity | Pin wear (mg) | 2.3 | 2.3 | 2.5 | 2.1 | 2.5 | 2.4 |

TABLE 4

|  |  | Comp. Ex. 1-1 | Comp. Ex. 1-2 | Comp. Ex. 1-3 | Comp. Ex. 1-4 | Comp. Ex. 1-5 |
|---|---|---|---|---|---|---|
| Composition (% by mass) | Base oil 1 | 100 | 99.95 | 99.85 | 99.9 | 99.85 |
|  | Base oil 2 | — | — | — | — | — |
|  | Base oil 3 | — | — | — | — | — |
|  | A1 | — | 0.05 | 0.15 | — | — |
|  | A2 | — | — | — | — | — |
|  | A3 | — | — | — | — | — |
|  | B1 | — | — | — | 0.1 | 0.15 |
|  | B2 | — | — | — | — | — |
|  | B3 | — | — | — | — | — |
|  | C1 | — | — | — | — | — |
|  | C2 | — | — | — | — | — |
|  | D1 | — | — | — | — | — |
|  | D2 | — | — | — | — | — |
|  | D3 | — | — | — | — | — |
|  | a1 | — | — | — | — | — |
|  | b1 | — | — | — | — | — |
|  | d1 | — | — | — | — | — |
|  | d2 | — | — | — | — | — |
|  | d3 | — | — | — | — | — |
| Stability | Acid value (mgKOH/g) | 0.51 | 0.28 | 0.31 | 0.29 | 0.32 |
|  | F content (ppm) | 260 | 125 | 131 | 119 | 129 |
|  | Color tone (ASTM color) | L2.0 | L2.0 | L2.0 | L2.0 | L2.0 |
|  | Catalyst appearance | Coloration | Coloration | Coloration | Coloration | Coloration |
| Lubricity | Pin wear (mg) | 15.2 | 2.9 | 2.5 | 15.9 | 14.8 |

|  |  | Comp. Ex. 1-6 | Comp. Ex. 1-7 | Comp. Ex. 1-8 | Comp. Ex. 1-9 |
|---|---|---|---|---|---|
| Composition (% by mass) | Base oil 1 | 99.85 | 98.9 | 99.85 | 98.9 |
|  | Base oil 2 | — | — | — | — |
|  | Base oil 3 | — | — | — | — |
|  | A1 | — | — | 0.05 | — |

TABLE 4-continued

|  |  |  |  |  |  |
|---|---|---|---|---|---|
|  | A2 | — | — | — | — |
|  | A3 | — | — | — | — |
|  | B1 | 0.1 | 0.1 | — | 0.1 |
|  | B2 | — | — | — | — |
|  | B3 | — | — | — | — |
|  | C1 | — | — | — | — |
|  | C2 | — | — | — | — |
|  | D1 | — | — | — | — |
|  | D2 | — | — | — | — |
|  | D3 | — | — | — | — |
|  | a1 | 0.05 | 1.0 | — | 1.0 |
|  | b1 | — | — | 0.1 | — |
|  | d1 | — | — | — | — |
|  | d2 | — | — | — | — |
|  | d3 | — | — | — | — |
| Stability | Acid value (mgKOH/g) | 0.43 | 1.51 | 0.31 | 0.01 |
|  | F content (ppm) | 221 | 270 | 132 | <1 |
|  | Color tone (ASTM color) | L2.0 | L2.0 | L2.0 | L0.5 |
|  | Catalyst appearance | Coloration | Coloration | Coloration | No change |
| Lubricity | Pin wear (mg) | 14.8 | 4.1 | 2.8 | 3.9 |

Examples 2-1 to 2-33, Comparative Examples 2-1 to 2-9

For Examples 2-1 to 2-33 and Comparative Examples 2-1 to 2-9, refrigerating machine oils were prepared using the base oils and additives listed below. The properties of the obtained refrigerating machine oils are shown in Tables 5 to 8.
(Base Oils)
Base oil 1: Polyethylenepropyleneglycol monomethyl ether
Base oil 2: Polypropyleneglycol dimethyl ether
Base oil 3: Polyvinyl ether
(Additives)
A1: Oleylamine salt of di(2-ethylhexyl)acid phosphate
A2: 2-Ethylhexylamine salt of dioctyl acid phosphate
A3: Mono(C11-C14 mixed alkyl)amine salt of dihexyl acid phosphate
B1: Dioctyldiphenylamine
C1: Benzotriazole
C2: N,N-bis(2-Ethylhexyl)-methylbenzotriazole
D1: 1,2-Epoxycyclohexane
D2: 3,4-Epoxycyclohexylmethyl-3,4-epoxycyclohexane carboxylate
D3: 4-(1'-Methylepoxyethyl)-1,2-epoxy-2-methylcyclohexane
a1: Tricresyl phosphate
b1: 2,6-di-t-Butyl-p-cresol
c1: 2,5-bis(Alkyldithio) 1,3,4-thiadiazole
d1: p-t-Butylphenyl glycidyl ether
d2: Glycidyl-2,2'-dimethyl octanoate
d3: 1,2-Epoxyoctadecane Each of the refrigerating machine oils obtained in Examples 2-1 to 2-33 and Comparative Examples 2-1 to 2-9 was subjected to an evaluation test in the following manner.
(Thermal/Chemical Stability Evaluation)
A test was conducted by filling 30 g of a sample oil prepared to a moisture content of no greater than 100 ppm by mass (initial color tone: L0.5) and 30 g of 2,3,3,3-tetrafluoropropene into a 200 ml stainless steel autoclave together with a catalyst (iron, copper and aluminum wires), and then heating this to 175° C. and storing for 2 weeks. Following the test, the refrigerating machine oil composition color tone, acid value and fluorine ion content and changes in catalyst outer appearance were measured. The obtained results are shown in Tables 5 to 8.
(Evaluation of Lubricity)
A test was conducted for 1 hour according to ASTM D2670 while blowing 2,3,3,3-tetrafluoropropene into the sample oil at 10 L/h, with an oil temperature of 80° C. and a load of 250 LB, and the pin wear after the test was measured. The obtained results are shown in Tables 5 to 8.

TABLE 5

|  |  | Example 2-1 | Example 2-2 | Example 2-3 | Example 2-4 | Example 2-5 |
|---|---|---|---|---|---|---|
| Composition (% by mass) | Base oil 1 | 99.965 | 99.945 | 99.895 | 99.94 | 99.949 |
|  | Base oil 2 | — | — | — | — | — |
|  | Base oil 3 | — | — | — | — | — |
|  | A1 | 0.03 | 0.05 | 0.1 | 0.05 | 0.05 |
|  | A2 | — | — | — | — | — |
|  | A3 | — | — | — | — | — |
|  | B1 | — | — | — | — | — |
|  | C1 | 0.005 | 0.005 | 0.005 | 0.01 | 0.001 |
|  | C2 | — | — | — | — | — |
|  | D1 | — | — | — | — | — |
|  | D2 | — | — | — | — | — |
|  | D3 | — | — | — | — | — |
|  | a1 | — | — | — | — | — |
|  | b1 | — | — | — | — | — |
|  | c1 | — | — | — | — | — |
|  | d1 | — | — | — | — | — |
|  | d2 | — | — | — | — | — |
|  | d3 | — | — | — | — | — |
| Stability | Acid value (mgKOH/g) | 0.12 | 0.13 | 0.15 | 0.13 | 0.15 |
|  | F content (ppm) | 35 | 31 | 38 | 35 | 41 |

TABLE 5-continued

|  |  |  |  |  |  |  |
|---|---|---|---|---|---|---|
|  | Color tone (ASTM color) | L0.5 | L0.5 | L0.5 | L0.5 | L0.5 |
|  | Catalyst appearance | No change | No Change | No change | No change | No change |
| Lubricity | Pin wear (mg) | 2.8 | 2.5 | 2.2 | 2.6 | 2.2 |

|  |  | Example 2-6 | Example 2-7 | Example 2-8 | Example 2-9 | Example 2-10 |
|---|---|---|---|---|---|---|
| Composition (% by mass) | Base oil 1 | 99.94 | 99.90 | 99.965 | 99.945 | 99.895 |
|  | Base oil 2 | — | — | — | — | — |
|  | Base oil 3 | — | — | — | — | — |
|  | A1 | 0.05 | 0.05 | — | — | — |
|  | A2 | — | — | 0.03 | 0.05 | 0.1 |
|  | A3 | — | — | — | — | — |
|  | B1 | — | — | — | — | — |
|  | C1 | — | — | 0.005 | 0.005 | 0.005 |
|  | C2 | 0.01 | 0.05 | — | — | — |
|  | D1 | — | — | — | — | — |
|  | D2 | — | — | — | — | — |
|  | D3 | — | — | — | — | — |
|  | a1 | — | — | — | — | — |
|  | b1 | — | — | — | — | — |
|  | c1 | — | — | — | — | — |
|  | d1 | — | — | — | — | — |
|  | d2 | — | — | — | — | — |
|  | d3 | — | — | — | — | — |
| Stability | Acid value (mgKOH/g) | 0.11 | 0.12 | 0.12 | 0.11 | 0.13 |
|  | F content (ppm) | 29 | 32 | 32 | 31 | 35 |
|  | Color tone (ASTM color) | L0.5 | L0.5 | L0.5 | L0.5 | L0.5 |
|  | Catalyst appearance | No change | No change | No change | No change | No change |
| Lubricity | Pin wear (mg) | 2.4 | 2.6 | 2.8 | 2.4 | 2.2 |

TABLE 6

|  |  | Example 2-11 | Example 2-12 | Example 2-13 | Example 2-14 | Example 2-15 |
|---|---|---|---|---|---|---|
| Composition (% by mass) | Base oil 1 | 99.94 | 99.949 | 99.94 | 99.90 | 99.965 |
|  | Base oil 2 | — | — | — | — | — |
|  | Base oil 3 | — | — | — | — | — |
|  | A1 | — | — | — | — | — |
|  | A2 | 0.05 | 0.05 | 0.05 | 0.05 | — |
|  | A3 | — | — | — | — | 0.03 |
|  | B1 | — | — | — | — | — |
|  | C1 | 0.01 | 0.001 | — | — | 0.005 |
|  | C2 | — | — | 0.01 | 0.05 | — |
|  | D1 | — | — | — | — | — |
|  | D2 | — | — | — | — | — |
|  | D3 | — | — | — | — | — |
|  | a1 | — | — | — | — | — |
|  | b1 | — | — | — | — | — |
|  | c1 | — | — | — | — | — |
|  | d1 | — | — | — | — | — |
|  | d2 | — | — | — | — | — |
|  | d3 | — | — | — | — | — |
| Stability | Acid value (mgKOH/g) | 0.14 | 0.13 | 0.17 | 0.14 | 0.11 |
|  | F content (ppm) | 31 | 37 | 42 | 36 | 29 |
|  | Color tone (ASTM color) | L0.5 | L0.5 | L0.5 | L0.5 | L0.5 |
|  | Catalyst appearance | No change | No change | No change | No change | No change |
| Lubricity | Pin wear (mg) | 2.3 | 2.4 | 2.4 | 2.6 | 2.3 |

|  |  | Example 2-6 | Example 2-7 | Example 2-8 | Example 2-9 | Example 2-10 |
|---|---|---|---|---|---|---|
| Composition (% by mass) | Base oil 1 | 99.945 | 99.895 | 99.94 | 99.949 | 99.94 |
|  | Base oil 2 | — | — | — | — | — |
|  | Base oil 3 | — | — | — | — | — |
|  | A1 | — | — | — | — | — |
|  | A2 | — | — | — | — | — |
|  | A3 | 0.05 | 0.1 | 0.05 | 0.05 | 0.05 |
|  | B1 | — | — | — | — | — |
|  | C1 | 0.005 | 0.005 | 0.01 | 0.001 | — |
|  | C2 | — | — | — | — | 0.01 |
|  | D1 | — | — | — | — | — |
|  | D2 | — | — | — | — | — |
|  | D3 | — | — | — | — | — |
|  | a1 | — | — | — | — | — |
|  | b1 | — | — | — | — | — |

TABLE 6-continued

|  |  |  |  |  |  |  |
|---|---|---|---|---|---|---|
|  | c1 | — | — | — | — | — |
|  | d1 | — | — | — | — | — |
|  | d2 | — | — | — | — | — |
|  | d3 | — | — | — | — | — |
| Stability | Acid value (mgKOH/g) | 0.13 | 0.15 | 0.14 | 0.15 | 0.11 |
|  | F content (ppm) | 36 | 40 | 37 | 38 | 29 |
|  | Color tone (ASTM color) | L0.5 | L0.5 | L0.5 | L0.5 | L0.5 |
|  | Catalyst appearance | No change | No change | No change | No change | No change |
| Lubricity | Pin wear (mg) | 2.4 | 2.1 | 2.5 | 2.5 | 2.4 |

TABLE 7

|  |  | Example 2-21 | Example 2-22 | Example 2-23 | Example 2-24 | Example 2-25 | Example 2-26 |
|---|---|---|---|---|---|---|---|
| Composition (% by mass) | Base oil 1 | — | — | 99.845 | 99.80 | 99.845 | 99.80 |
|  | Base oil 2 | 99.945 | — | — | — | — | — |
|  | Base oil 3 | — | 99.90 | — | — | — | — |
|  | A1 | 0.05 | 0.05 | 0.05 | 0.05 | 0.05 | 0.05 |
|  | A2 | — | — | — | — | — | — |
|  | A3 | — | — | — | — | — | — |
|  | B1 | — | — | 0.1 | 0.1 | — | — |
|  | C1 | 0.005 | — | 0.005 | — | 0.005 | — |
|  | C2 | — | 0.05 | — | 0.05 | — | 0.05 |
|  | D1 | — | — | — | — | — | — |
|  | D2 | — | — | — | — | — | — |
|  | D3 | — | — | — | — | — | — |
|  | a1 | — | — | — | — | — | — |
|  | b1 | — | — | — | — | 0.1 | 0.1 |
|  | c1 | — | — | — | — | — | — |
|  | d1 | — | — | — | — | — | — |
|  | d2 | — | — | — | — | — | — |
|  | d3 | — | — | — | — | — | — |
| Stability | Acid value (mgKOH/g) | 0.12 | 0.14 | 0.05 | 0.04 | 0.11 | 0.12 |
|  | F content (ppm) | 0.32 | 0.37 | 12 | 13 | 18 | 21 |
|  | Color tone (ASTM color) | L0.5 | L0.5 | L0.5 | L0.5 | L0.5 | L0.5 |
|  | Catalyst appearance | No change | No change | No change | No change | No change | No change |
| Lubricity | Pin wear (mg) | 2.5 | 2.1 | 2.1 | 2.5 | 2.3 | 2.7 |

|  |  | Example 2-27 | Example 2-28 | Example 2-29 | Example 2-30 | Example 2-31 | Example 2-32 |
|---|---|---|---|---|---|---|---|
| Composition (% by mass) | Base oil 1 | 98.945 | 98.90 | 98.945 | 98.90 | 98.945 | 98.90 |
|  | Base oil 2 | — | — | — | — | — | — |
|  | Base oil 3 | — | — | — | — | — | — |
|  | A1 | 0.05 | 0.05 | 0.05 | 0.05 | 0.05 | 0.05 |
|  | A2 | — | — | — | — | — | — |
|  | A3 | — | — | — | — | — | — |
|  | B1 | — | — | — | — | — | — |
|  | C1 | 0.005 | — | 0.005 | — | 0.005 | — |
|  | C2 | — | 0.05 | — | 0.05 | — | 0.05 |
|  | D1 | 1.0 | — | — | — | — | — |
|  | D2 | — | 1.0 | — | — | — | — |
|  | D3 | — | — | 1.0 | — | — | — |
|  | a1 | — | — | — | — | — | — |
|  | b1 | — | — | — | — | — | — |
|  | c1 | — | — | — | — | — | — |
|  | d1 | — | — | — | 1.0 | — | — |
|  | d2 | — | — | — | — | 1.0 | — |
|  | d3 | — | — | — | — | — | 1.0 |
| Stability | Acid value (mgKOH/g) | 0.01 | 0.01 | 0.01 | 0.02 | 0.02 | 0.02 |
|  | F content (ppm) | <1 | <1 | <1 | 2 | 3 | 2 |
|  | Color tone (ASTM color) | L0.5 | L0.5 | L0.5 | L0.5 | L0.5 | L0.5 |
|  | Catalyst appearance | No change | No change | No change | No change | No change | No change |
| Lubricity | Pin wear (mg) | 2.2 | 2.4 | 2.2 | 2.3 | 2.5 | 2.3 |

TABLE 8

|  |  | Comp. Ex. 2-1 | Comp. Ex. 2-2 | Comp. Ex. 2-3 | Comp. Ex. 2-4 | Comp. Ex. 2-5 |
|---|---|---|---|---|---|---|
| Composition (% by mass) | Base oil 1 | 100 | 99.95 | 99.90 | 99.995 | 99.95 |
|  | Base oil 2 | — | — | — | — | — |
|  | Base oil 3 | — | — | — | — | — |
|  | A1 | — | 0.05 | 0.1 | — | — |

TABLE 8-continued

|   |   |   |   |   |   |   |
|---|---|---|---|---|---|---|
|   | A2 | — | — | — | — | — |
|   | A3 | — | — | — | — | — |
|   | B1 | — | — | — | — | — |
|   | C1 | — | — | — | 0.005 | — |
|   | C2 | — | — | — | — | 0.05 |
|   | D1 | — | — | — | — | — |
|   | D2 | — | — | — | — | — |
|   | D3 | — | — | — | — | — |
|   | a1 | — | — | — | — | — |
|   | b1 | — | — | — | — | — |
|   | c1 | — | — | — | — | — |
|   | d1 | — | — | — | — | — |
|   | d2 | — | — | — | — | — |
|   | d3 | — | — | — | — | — |
| Stability | Acid value (mgKOH/g) | 0.51 | 0.28 | 0.3 | 0.45 | 0.42 |
|   | F content (ppm) | 260 | 125 | 129 | 210 | 215 |
|   | Color tone (ASTM color) | L2.0 | L2.0 | L2.0 | L2.0 | L2.0 |
|   | Catalyst appearance | Coloration | Coloration | Coloration | Coloration | Coloration |
| Lubricity | Pin wear (mg) | 15.2 | 2.9 | 2.5 | 15.1 | 15.6 |

|   |   | Comp. Ex. 2-6 | Comp. Ex. 2-7 | Comp. Ex. 2-8 | Comp. Ex. 2-9 |
|---|---|---|---|---|---|
| Composition (% by mass) | Base oil 1 | 99.945 | 98.95 | 99.90 | 98.995 |
|   | Base oil 2 | — | — | — | — |
|   | Base oil 3 | — | — | — | — |
|   | A1 | — | — | 0.05 | — |
|   | A2 | — | — | — | — |
|   | A3 | — | — | — | — |
|   | B1 | — | — | — | — |
|   | C1 | 0.005 | — | — | 0.005 |
|   | C2 | — | 0.05 | — | — |
|   | D1 | — | — | — | — |
|   | D2 | — | — | — | — |
|   | D3 | — | — | — | — |
|   | a1 | 0.05 | 1.0 | — | 1.0 |
|   | b1 | — | — | — | — |
|   | c1 | — | — | 0.05 | — |
|   | d1 | — | — | — | — |
|   | d2 | — | — | — | — |
|   | d3 | — | — | — | — |
| Stability | Acid value (mgKOH/g) | 0.54 | 1.62 | 2.13 | 0.01 |
|   | F content (ppm) | 256 | 311 | 356 | <1 |
|   | Color tone (ASTM color) | L2.0 | L2.0 | L4.0 | L0.5 |
|   | Catalyst appearance | Coloration | Coloration | Coloration | No change |
| Lubricity | Pin wear (mg) | 15.5 | 3.9 | 2.7 | 3.8 |

Examples 3-1 to 3-15, Comparative Examples 3-1 to 3-9

For Examples 3-1 to 3-15 and Comparative Examples 3-1 to 3-9, refrigerating machine oils were prepared using the base oils and additives listed below. The properties of the obtained refrigerating machine oils are shown in Tables 9 to 10.

(Base Oils)

Base oil 1: Polyethylenepropyleneglycol monomethyl ether (Additives)

A1: Oleylamine salt of di(2-ethylhexyl)acid phosphate

A2: 2-Ethylhexylamine salt of dioctyl acid phosphate

A3: Mono(C11-C14 mixed alkyl)amine salt of dihexyl acid phosphate

D1: 1,2-Epoxycyclohexane

D2: 3,4-Epoxycyclohexylmethyl-3,4-epoxycyclohexane carboxylate

D3: 4-(1'-Methylepoxyethyl)-1,2-epoxy-2-methylcyclohexane a1: Tricresyl phosphate d1: p-t-Butylphenyl glycidyl ether Each of the refrigerating machine oils obtained in Examples 3-1 to 3-15 and Comparative Examples 3-1 to 3-10 was subjected to an evaluation test in the following manner.

(Thermal/Chemical Stability Evaluation)

A test was conducted by filling 30 g of a sample oil prepared to a moisture content of no greater than 100 ppm by mass (initial color tone: L0.5) and 30 g of 2,3,3,3-tetrafluoropropene into a 200 ml stainless steel autoclave together with a catalyst (iron, copper and aluminum wires), and then heating this to 175° C. and storing for 2 weeks. Following the test, the refrigerating machine oil composition color tone, acid value and fluorine ion content and changes in catalyst outer appearance were measured. The obtained results are shown in Tables 9 and 10.

(Evaluation of Lubricity)

A test was conducted for 1 hour according to ASTM D2670 while blowing 2,3,3,3-tetrafluoropropene into the sample oil at 10 L/h, with an oil temperature of 80° C. and a load of 250 LB, and the pin wear after the test was measured. The obtained results are shown in Tables 9 and 10.

TABLE 9

|  |  | Example 3-1 | Example 3-2 | Example 3-3 | Example 3-4 | Example 3-5 | Example 3-6 |
|---|---|---|---|---|---|---|---|
| Composition (% by mass) | Base oil 1 | 98.97 | 98.47 | 99.47 | 98.97 | 98.97 | 98.97 |
|  | A1 | 0.03 | 0.03 | 0.03 | 0.03 | 0.03 | — |
|  | A2 | — | — | — | — | — | 0.03 |
|  | A3 | — | — | — | — | — | — |
|  | D1 | 1.0 | 1.5 | 0.5 | — | — | 1.0 |
|  | D2 | — | — | — | 1.0 | — | — |
|  | D3 | — | — | — | — | 1.0 | — |
|  | a1 | — | — | — | — | — | — |
|  | d1 | — | — | — | — | — | — |
| Stability | Acid value (mgKOH/g) | 0.01 | 0.01 | 0.02 | 0.01 | 0.01 | 0.01 |
|  | F content (ppm) | <1 | <1 | 2 | <1 | <1 | <1 |
|  | Color tone (ASTM color) | L0.5 | L0.5 | L0.5 | L0.5 | L0.5 | L0.5 |
|  | Catalyst appearance | Reduced gloss | Reduced gloss | Reduced gloss | Reduced gloss | Reduced gloss | Reduced gloss |
| Lubricity | Pin wear (mg) | 2.5 | 2.5 | 2.4 | 2.6 | 2.5 | 2.6 |

|  |  | Example 3-7 | Example 3-8 | Example 3-9 | Example 3-10 | Example 3-11 | Example 3-12 |
|---|---|---|---|---|---|---|---|
| Composition (% by mass) | Base oil 1 | 98.47 | 99.47 | 98.97 | 98.97 | 98.97 | 98.47 |
|  | A1 | — | — | — | — | — | — |
|  | A2 | 0.03 | 0.03 | 0.03 | 0.03 | — | — |
|  | A3 | — | — | — | — | 0.03 | 0.03 |
|  | D1 | 1.5 | 0.5 | — | — | 1.0 | 1.5 |
|  | D2 | — | — | 1.0 | — | — | — |
|  | D3 | — | — | — | 1.0 | — | — |
|  | a1 | — | — | — | — | — | — |
|  | d1 | — | — | — | — | — | — |
| Stability | Acid value (mgKOH/g) | 0.01 | 0.02 | 0.01 | 0.01 | 0.01 | 0.01 |
|  | F content (ppm) | <1 | 2 | <1 | <1 | <1 | <1 |
|  | Color tone (ASTM color) | L0.5 | L0.5 | L0.5 | L0.5 | L0.5 | L0.5 |
|  | Catalyst appearance | Reduced gloss | Reduced gloss | Reduced gloss | Reduced gloss | Reduced gloss | Reduced gloss |
| Lubricity | Pin wear (mg) | 2.4 | 2.5 | 2.6 | 2.5 | 2.3 | 2.5 |

TABLE 10

|  |  | Example 3-13 | Example 3-14 | Example 3-15 | Comp. Ex. 3-1 | Comp. Ex. 3-2 | Comp. Ex. 3-3 |
|---|---|---|---|---|---|---|---|
| Composition (% by mass) | Base oil 1 | 99.47 | 98.97 | 98.97 | 100 | 99.97 | 99.0 |
|  | A1 | — | — | — | — | 0.03 | — |
|  | A2 | — | — | — | — | — | — |
|  | A3 | 0.03 | 0.03 | 0.03 | — | — | — |
|  | D1 | 0.5 | — | — | — | — | 1.0 |
|  | D2 | — | 1.0 | — | — | — | — |
|  | D3 | — | — | 1.0 | — | — | — |
|  | a1 | — | — | — | — | — | — |
|  | d1 | — | — | — | — | — | — |
| Stability | Acid value (mgKOH/g) | 0.02 | 0.01 | 0.01 | 0.51 | 0.25 | 0.01 |
|  | F content (ppm) | 2 | <1 | <1 | 260 | 116 | <1 |
|  | Color tone (ASTM color) | L0.5 | L0.5 | L0.5 | L2.0 | L2.0 | L0.5 |
|  | Catalyst appearance | Reduced gloss | Reduced gloss | Reduced gloss | Coloration | Coloration | No change |
| Lubricity | Pin wear (mg) | 2.5 | 2.4 | 2.3 | 15.2 | 2.9 | 14.9 |

|  |  | Comp. Ex. 3-4 | Comp. Ex. 3-5 | Comp. Ex. 3-6 | Comp. Ex. 3-7 | Comp. Ex. 3-8 | Comp. Ex. 3-9 |
|---|---|---|---|---|---|---|---|
| Composition (% by mass) | Base oil 1 | 99.0 | 99.0 | 98.97 | 98.0 | 98.97 | 98.0 |
|  | A1 | — | — | — | — | 0.03 | — |
|  | A2 | — | — | — | — | — | — |
|  | A3 | — | — | — | — | — | — |
|  | D1 | — | — | 1.0 | 1.0 | — | 1.0 |
|  | D2 | 1.0 | — | — | — | — | — |
|  | D3 | — | 1.0 | — | — | — | — |
|  | a1 | — | — | 0.03 | 1.0 | — | 1.0 |
|  | d1 | — | — | — | — | 1.0 | — |
| Stability | Acid value (mgKOH/g) | 0.01 | 0.01 | 0.01 | 0.69 | 0.39 | 0.01 |
|  | F content (ppm) | <1 | <1 | <1 | 289 | 190 | <1 |
|  | Color tone (ASTM color) | L0.5 | L0.5 | L0.5 | L2.0 | L2.0 | L0.5 |
|  | Catalyst appearance | No change | No change | No change | Coloration | Coloration | No change |
| Lubricity | Pin wear (mg) | 15.9 | 15.5 | 15.7 | 4.5 | 2.9 | 4.2 |

Examples 4-1 to 4-30, Comparative Examples 4-1 to 4-10

For Examples 4-1 to 4-30 and Comparative Examples 1 to 10, refrigerating machine oils were prepared using the base oils and additives listed below. The properties of the obtained refrigerating machine oils are shown in Tables 11 to 14.
(Base Oils)
Base oil 1: Polyethylenepropyleneglycol monomethyl ether
Base oil 2: Polypropyleneglycol dimethyl ether
Base oil 3: Polyvinyl ether
(Additives)
A1: Oleylamine salt of di(2-ethylhexyl)acid phosphate
A2: 2-Ethylhexylamine salt of dioctyl acid phosphate
A3: Mono(C11-C14 mixed alkyl)amine salt of dihexyl acid phosphate
B1: Dioctyldiphenylamine
C1: Benzotriazole
C2: N,N-bis(2-Ethylhexyl)-methylbenzotriazole
D1: 1,2-Epoxycyclohexane
D2: 3,4-Epoxycyclohexylmethyl-3,4-epoxycyclohexane carboxylate
D3: 4-(1'-Methylepoxyethyl)-1,2-epoxy-2-methylcyclohexane
a1: Tricresyl phosphate
d1: p-t-Butylphenyl glycidyl ether Each of the refrigerating machine oils obtained in Examples 4-1 to 4-30 and Comparative Examples 4-1 to 4-10 was subjected to an evaluation test in the following manner.
(Thermal/Chemical Stability Evaluation)
A test was conducted by filling 30 g of a sample oil prepared to a moisture content of no greater than 100 ppm by mass (initial color tone: L0.5) and 30 g of 2,3,3,3-tetrafluoropropene into a 200 ml stainless steel autoclave together with a catalyst (iron, copper and aluminum wires), and then heating this to 175° C. and storing for 2 weeks. Following the test, the refrigerating machine oil composition color tone, acid value and fluorine ion content and changes in catalyst outer appearance were measured. The results are shown in Tables 11 to 14.
(Evaluation of Lubricity)
A test was conducted for 1 hour according to ASTM D2670 while blowing 2,3,3,3-tetrafluoropropene into the sample oil at 10 L/h, with an oil temperature of 80° C. and a load of 250 LB, and the pin wear after the test was measured. The obtained results are shown in Tables 11 to 14.

TABLE 11

|  |  | Example 4-1 | Example 4-2 | Example 4-3 | Example 4-4 | Example 4-5 |
|---|---|---|---|---|---|---|
| Composition (% by mass) | Base oil 1 | 98.95 | 98.9 | 98.45 | 99.45 | 98.95 |
|  | Base oil 2 | — | — | — | — | — |
|  | Base oil 3 | — | — | — | — | — |
|  | A1 | 0.05 | 0.1 | 0.05 | 0.05 | 0.05 |
|  | A2 | — | — | — | — | — |
|  | A3 | — | — | — | — | — |
|  | B1 | — | — | — | — | — |
|  | C1 | — | — | — | — | — |
|  | C2 | — | — | — | — | — |
|  | D1 | 1.0 | 1.0 | 1.5 | 0.5 | — |
|  | D2 | — | — | — | — | 1.0 |
|  | D3 | — | — | — | — | — |
|  | a1 | — | — | — | — | — |
|  | d1 | — | — | — | — | — |
| Stability | Acid value (mgKOH/g) | 0.01 | 0.01 | 0.01 | 0.02 | 0.01 |
|  | F content (ppm) | <1 | <1 | <1 | 2 | <1 |
|  | Color tone (ASTM color) | L0.5 | L0.5 | L0.5 | L0.5 | L0.5 |
|  | Catalyst appearance | Reduced gloss | Reduced gloss | Reduced gloss | Reduced gloss | Reduced gloss |
| Lubricity | Pin wear (mg) | 2.2 | 2.1 | 2.4 | 2.3 | 2.5 |

|  |  | Example 4-6 | Example 4-7 | Example 4-8 | Example 4-9 | Example 4-10 |
|---|---|---|---|---|---|---|
| Composition (% by mass) | Base oil 1 | 98.95 | 98.95 | 98.9 | 98.45 | 99.45 |
|  | Base oil 2 | — | — | — | — | — |
|  | Base oil 3 | — | — | — | — | — |
|  | A1 | 0.05 | — | — | — | — |
|  | A2 | — | 0.05 | 0.1 | 0.05 | 0.05 |
|  | A3 | — | — | — | — | — |
|  | B1 | — | — | — | — | — |
|  | C1 | — | — | — | — | — |
|  | C2 | — | — | — | — | — |
|  | D1 | — | 1.0 | 1.0 | 1.5 | 0.5 |
|  | D2 | — | — | — | — | — |
|  | D3 | 1.0 | — | — | — | — |
|  | a1 | — | — | — | — | — |
|  | d1 | — | — | — | — | — |
| Stability | Acid value (mgKOH/g) | 0.01 | 0.01 | 0.01 | 0.01 | 0.02 |
|  | F content (ppm) | <1 | <1 | <1 | <1 | 3 |
|  | Color tone (ASTM color) | L0.5 | L0.5 | L0.5 | L0.5 | L0.5 |
|  | Catalyst appearance | Reduced gloss | Reduced gloss | Reduced gloss | Reduced gloss | Reduced gloss |
| Lubricity | Pin wear (mg) | 2.5 | 2.4 | 2.2 | 2.5 | 2.4 |

TABLE 12

|  |  | Example 4-11 | Example 4-12 | Example 4-13 | Example 4-14 | Example 4-15 |
|---|---|---|---|---|---|---|
| Composition (% by mass) | Base oil 1 | 98.95 | 98.95 | 98.95 | 98.9 | 98.45 |
|  | Base oil 2 | — | — | — | — | — |
|  | Base oil 3 | — | — | — | — | — |
|  | A1 | — | — | — | — | — |
|  | A2 | 0.05 | 0.05 | — | — | — |
|  | A3 | — | — | 0.05 | 0.1 | 0.05 |
|  | B1 | — | — | — | — | — |
|  | C1 | — | — | — | — | — |
|  | C2 | — | — | — | — | — |
|  | D1 | — | — | 1.0 | 1.0 | 1.5 |
|  | D2 | 1.0 | — | — | — | — |
|  | D3 | — | 1.0 | — | — | — |
|  | a1 | — | — | — | — | — |
|  | d1 | — | — | — | — | — |
| Stability | Acid value (mgKOH/g) | 0.01 | 0.01 | 0.01 | 0.01 | 0.01 |
|  | F content (ppm) | <1 | <1 | <1 | <1 | <1 |
|  | Color tone (ASTM color) | L0.5 | L0.5 | L0.5 | L0.5 | L0.5 |
|  | Catalyst appearance | Reduced gloss | Reduced gloss | Reduced gloss | Reduced gloss | Reduced gloss |
| Lubricity | Pin wear (mg) | 2.4 | 2.2 | 2.5 | 2.6 | 2.6 |

|  |  | Example 4-16 | Example 4-17 | Example 4-18 | Example 4-19 | Example 4-20 |
|---|---|---|---|---|---|---|
| Composition (% by mass) | Base oil 1 | 99.45 | 98.95 | 98.95 | — | — |
|  | Base oil 2 | — | — | — | 98.95 | 98.95 |
|  | Base oil 3 | — | — | — | — | — |
|  | A1 | — | — | — | 0.05 | 0.05 |
|  | A2 | — | — | — | — | — |
|  | A3 | 0.05 | 0.05 | 0.05 | — | — |
|  | B1 | — | — | — | — | — |
|  | C1 | — | — | — | — | — |
|  | C2 | — | — | — | — | — |
|  | D1 | 0.5 | — | — | 1.0 | — |
|  | D2 | — | 1.0 | — | — | 1.0 |
|  | D3 | — | — | 1.0 | — | — |
|  | a1 | — | — | — | — | — |
|  | d1 | — | — | — | — | — |
| Stability | Acid value (mgKOH/g) | 0.02 | 0.01 | 0.01 | 0.01 | 0.01 |
|  | F content (ppm) | 2 | <1 | <1 | <1 | <1 |
|  | Color tone (ASTM color) | L0.5 | L0.5 | L0.5 | L0.5 | L0.5 |
|  | Catalyst appearance | Reduced gloss | Reduced gloss | Reduced gloss | No change | No change |
| Lubricity | Pin wear (mg) | 2.5 | 2.3 | 2.2 | 2.4 | 2.5 |

TABLE 13

|  |  | Example 4-21 | Example 4-22 | Example 4-23 | Example 4-24 | Example 4-25 |
|---|---|---|---|---|---|---|
| Composition (% by mass) | Base oil 1 | — | — | — | — | 98.85 |
|  | Base oil 2 | 98.95 | — | — | — | — |
|  | Base oil 3 | — | 98.95 | 98.95 | 98.95 | — |
|  | A1 | 0.05 | 0.05 | 0.05 | 0.05 | 0.05 |
|  | A2 | — | — | — | — | — |
|  | A3 | — | — | — | — | — |
|  | B1 | — | — | — | — | 0.1 |
|  | C1 | — | — | — | — | — |
|  | C2 | — | — | — | — | — |
|  | D1 | — | 1.0 | — | — | 1.0 |
|  | D2 | — | — | 1.0 | — | — |
|  | D3 | 1.0 | — | — | 1.0 | — |
|  | a1 | — | — | — | — | — |
|  | d1 | — | — | — | — | — |
| Stability | Acid value (mgKOH/g) | 0.01 | 0.01 | 0.01 | 0.01 | 0.01 |
|  | F content (ppm) | <1 | <1 | <1 | <1 | <1 |
|  | Color tone (ASTM color) | L0.5 | L0.5 | L0.5 | L0.5 | L0.5 |
|  | Catalyst appearance | No change | No change | No change | No change | No change |
| Lubricity | Pin wear (mg) | 2.3 | 2.3 | 2.3 | 2.4 | 2.3 |

TABLE 13-continued

|  |  | Example 4-26 | Example 4-27 | Example 4-28 | Example 4-29 | Example 4-30 |
|---|---|---|---|---|---|---|
| Composition (% by mass) | Base oil 1 | 98.85 | 98.85 | 98.945 | 98.9 | 98.945 |
|  | Base oil 2 | — | — | — | — | — |
|  | Base oil 3 | — | — | — | — | — |
|  | A1 | 0.05 | 0.05 | 0.05 | 0.05 | 0.05 |
|  | A2 | — | — | — | — | — |
|  | A3 | — | — | — | — | — |
|  | B1 | 0.1 | 0.1 | — | — | — |
|  | C1 | — | — | 0.005 | — | 0.005 |
|  | C2 | — | — | — | 0.05 | — |
|  | D1 | — | — | 1.0 | — | — |
|  | D2 | 1.0 | — | — | 1.0 | — |
|  | D3 | — | 1.0 | — | — | 1.0 |
|  | a1 | — | — | — | — | — |
|  | d1 | — | — | — | — | — |
| Stability | Acid value (mgKOH/g) | 0.01 | 0.01 | 0.01 | 0.01 | 0.01 |
|  | F content (ppm) | <1 | <1 | <1 | <1 | <1 |
|  | Color tone (ASTM color) | L0.5 | L0.5 | L0.5 | L0.5 | L0.5 |
|  | Catalyst appearance | No change | No change | No change | No change | No change |
| Lubricity | Pin wear (mg) | 2.3 | 2.5 | 2.2 | 2.4 | 2.2 |

TABLE 14

|  |  | Comp. Ex. 4-1 | Comp. Ex. 4-2 | Comp. Ex. 4-3 | Comp. Ex. 4-4 | Comp. Ex. 4-5 |
|---|---|---|---|---|---|---|
| Composition (% by mass) | Base oil 1 | 100 | 99.95 | 99.9 | 99.0 | 99.0 |
|  | Base oil 2 | — | — | — | — | — |
|  | Base oil 3 | — | — | — | — | — |
|  | A1 | — | 0.05 | 0.1 | — | — |
|  | A2 | — | — | — | — | — |
|  | A3 | — | — | — | — | — |
|  | B1 | — | — | — | — | — |
|  | C1 | — | — | — | — | — |
|  | C2 | — | — | — | — | — |
|  | D1 | — | — | — | 1.0 | — |
|  | D2 | — | — | — | — | 1.0 |
|  | D3 | — | — | — | — | — |
|  | a1 | — | — | — | — | — |
|  | d1 | — | — | — | — | — |
| Stability | Acid value (mgKOH/g) | 0.51 | 0.28 | 0.30 | 0.01 | 0.01 |
|  | F content (ppm) | 260 | 125 | 129 | <1 | <1 |
|  | Color tone (ASTM color) | L2.0 | L2.0 | L2.0 | L0.5 | L0.5 |
|  | Catalyst appearance | Coloration | Coloration | Coloration | No change | No change |
| Lubricity | Pin wear (mg) | 15.2 | 2.9 | 2.5 | 14.9 | 15.9 |

|  |  | Comp. Ex. 4-6 | Comp. Ex. 4-7 | Comp. Ex. 4-8 | Comp. Ex. 4-9 | Comp. Ex. 4-10 |
|---|---|---|---|---|---|---|
| Composition (% by mass) | Base oil 1 | 99.0 | 98.95 | 98.0 | 98.95 | 98.0 |
|  | Base oil 2 | — | — | — | — | — |
|  | Base oil 3 | — | — | — | — | — |
|  | A1 | — | — | — | 0.05 | — |
|  | A2 | — | — | — | — | — |
|  | A3 | — | — | — | — | — |
|  | B1 | — | — | — | — | — |
|  | C1 | — | — | — | — | — |
|  | C2 | — | — | — | — | — |
|  | D1 | — | 1.0 | 1.0 | — | 1.0 |
|  | D2 | — | — | — | — | — |
|  | D3 | 1.0 | — | — | — | — |
|  | a1 | — | 0.05 | 1.0 | — | 1.0 |
|  | d1 | — | — | — | 1.0 | — |
| Stability | Acid value (mgKOH/g) | 0.01 | 0.01 | 0.69 | 0.42 | 0.01 |
|  | F content (ppm) | <1 | <1 | 289 | 190 | <1 |
|  | Color tone (ASTM color) | L0.5 | L0.5 | L2.0 | L2.0 | L0.5 |
|  | Catalyst appearance | No change | No change | Coloration | Coloration | No change |
| Lubricity | Pin wear (mg) | 15.5 | 15.1 | 4.5 | 2.7 | 4.2 |

Examples 5-1 to 5-23, Comparative Examples 5-1 to 5-10

For Examples 5-1 to 5-23 and Comparative Examples 5-1 to 5-10, refrigerating machine oils were prepared using the base oils and additives listed below. The properties of the obtained refrigerating machine oils are shown in Tables 15 to 18.
(Base Oils)
Base oil 1: Polyethylenepropyleneglycol monomethyl ether
Base oil 2: Polypropyleneglycol dimethyl ether
Base oil 3: Polyvinyl ether
(Additives)
A-1: Oleylamine salt of di(2-ethylhexyl)acid phosphate
A-2: 2-Ethylhexylamine salt of dioctyl acid phosphate
A-3: Mono(C11-C14 mixed alkylamine salt of dihexyl acid phosphate
B-1: Dioctyldiphenylamine
B-2: Dinonyldiphenylamine
B-3: Octylphenyl-α-naphthylamine
C-1: Benzotriazole
C-2: N,N-bis(2-Ethylhexyl)-methylbenzotriazole
D-1: 1,2-Epoxycyclohexane
D-2: 3,4-Epoxycyclohexylmethyl-3,4-epoxycyclohexane carboxylate
D-3: 4-(1'-Methylepoxyethyl)-1,2-epoxy-2-methylcyclohexane
a-1: Tricresyl phosphate
b-1: 2,6-di-t-Butyl-p-cresol
b-2: C7-C9 Branched alkyl ester of 3,5-bis(1,1-Dimethyl-ethyl)-4-hydroxy-benzenepropanoic acid
c-1: 2,5-bis(Alkyldithio) 1,3,4-thiadiazole
d-1: p-t-Butylphenyl glycidyl ether
d-2: Glycidyl-2,2'-dimethyl octanoate
d-3: 1,2-Epoxyoctadecane Each of the refrigerating machine oils obtained in Examples 5-1 to 5-23 and Comparative Examples 5-1 to 5-10 was subjected to an evaluation test in the following manner.
(Thermal/Chemical Stability Evaluation)
A test was conducted by filling 30 g of a sample oil prepared to a moisture content of no greater than 100 ppm by mass (initial color tone: L0.5) and 30 g of 2,3,3,3-tetrafluoropropene into a 200 ml stainless steel autoclave together with a catalyst (iron, copper and aluminum wires), and then heating this to 175° C. and storing for 2 weeks. Following the test, the refrigerating machine oil composition color tone, acid value and fluorine ion content and changes in catalyst outer appearance were measured. The obtained results are shown in Tables 15 to 18.
(Evaluation of Lubricity)
A test was conducted for 1 hour according to ASTM D2670 while blowing 2,3,3,3-tetrafluoropropene into the sample oil at 10 L/h, with an oil temperature of 80° C. and a load of 250 LB, and the pin wear after the test was measured. The obtained results are shown in Tables 15 to 18.

TABLE 15

|  |  | Example 5-1 | Example 5-2 | Example 5-3 | Example 5-4 | Example 5-5 |
|---|---|---|---|---|---|---|
| Composition (% by mass) | Base oil 1 | 98.865 | 98.81 | 98.81 | 98.765 | 98.71 |
|  | Base oil 2 | — | — | — | — | — |
|  | Base oil 3 | — | — | — | — | — |
|  | A1 | 0.03 | 0.03 | 6.03 | 0.03 | 0.03 |
|  | A2 | — | — | — | — | — |
|  | A3 | — | — | — | — | — |
|  | B1 | 0.1 | — | — | 0.1 | — |
|  | B2 | — | 0.1 | — | — | 0.1 |
|  | B3 | — | — | 0.1 | — | — |
|  | C1 | 0.005 | — | — | 0.005 | — |
|  | C2 | — | 0.06 | 0.06 | — | 0.06 |
|  | D1 | 1.0 | — | — | 1.0 | — |
|  | D2 | — | 1.0 | — | — | 1.0 |
|  | D3 | — | — | 1.0 | — | — |
|  | a1 | — | — | — | — | — |
|  | b1 | — | — | — | 0.1 | — |
|  | b2 | — | — | — | — | 0.1 |
|  | c1 | — | — | — | — | — |
|  | d1 | — | — | — | — | — |
|  | d2 | — | — | — | — | — |
|  | d3 | — | — | — | — | — |
| Stability | Acid value (mgKOH/g) | 0.01 | 0.01 | 0.01 | 0.01 | 0.01 |
|  | F content (ppm) | <1 | <1 | <1 | <1 | <1 |
|  | Color tone (ASTM color) | L0.5 | L0.5 | L0.5 | L0.5 | L0.5 |
|  | Catalyst appearance | No change | No change | No change | No change | No change |
| Lubricity | Pin wear (mg) | 2.9 | 2.8 | 2.7 | 2.9 | 2.5 |
|  |  | Example 5-6 | Example 5-7 | Example 5-8 | Example 5-9 | Example 5-10 |
| Composition (% by mass) | Base oil 1 | 98.71 | 96.515 | 96.46 | 96.515 | 96.46 |
|  | Base oil 2 | — | — | — | — | — |
|  | Base oil 3 | — | — | — | — | — |
|  | A1 | 0.03 | — | — | — | — |
|  | A2 | — | 0.03 | 0.03 | 0.03 | 0.03 |
|  | A3 | — | — | — | — | — |
|  | B1 | — | 0.15 | 0.15 | — | — |
|  | B2 | — | — | — | 0.15 | — |
|  | B3 | 0.1 | — | — | — | 0.15 |
|  | C1 | — | 0.005 | — | 0.005 | — |
|  | C2 | 0.06 | — | 0.06 | — | 0.06 |
|  | D1 | — | 1.5 | — | — | — |
|  | D2 | — | — | — | 1.5 | — |

TABLE 15-continued

|  |  |  |  |  |  |  |
|---|---|---|---|---|---|---|
|  | D3 | 1.0 | — | 1.5 | — | 1.5 |
|  | a1 | — | — | — | — | — |
|  | b1 | 0.1 | 0.3 | — | 0.3 | — |
|  | b2 | — | — | 0.3 | — | 0.3 |
|  | c1 | — | — | — | — | — |
|  | d1 | — | 1.5 | 1.5 | — | — |
|  | d2 | — | — | — | 1.5 | — |
|  | d3 | — | — | — | — | 1.5 |
| Stability | Acid value (mgKOH/g) | 0.01 | 0.01 | 0.01 | 0.01 | 0.01 |
|  | F content (ppm) | <1 | <1 | <1 | <1 | <1 |
|  | Color tone (ASTM color) | L0.5 | L0.5 | L0.5 | L0.5 | L0.5 |
|  | Catalyst appearance | No change | No change | No change | No change | No change |
| Lubricity | Pin wear (mg) | 2.8 | 2.8 | 2.7 | 2.6 | 2.7 |

TABLE 16

|  |  | Example 5-11 | Example 5-12 | Example 5-13 | Example 5-14 | Example 5-15 |
|---|---|---|---|---|---|---|
| Composition (% by mass) | Base oil 1 | — | — | — | — | — |
|  | Base oil 2 | 98.865 | 98.81 | 98.81 | 98.765 | 98.71 |
|  | Base oil 3 | — | — | — | — | — |
|  | A1 | 0.03 | 0.03 | 0.03 | 0.03 | 0.03 |
|  | A2 | — | — | — | — | — |
|  | A3 | — | — | — | — | — |
|  | B1 | 0.1 | — | — | 0.1 | — |
|  | B2 | — | 0.1 | — | — | 0.1 |
|  | B3 | — | — | 0.1 | — | — |
|  | C1 | 0.005 | — | — | 0.005 | — |
|  | C2 | — | 0.06 | 0.06 | — | 0.06 |
|  | D1 | 1.0 | — | — | 1.0 | — |
|  | D2 | — | 1.0 | — | — | 1.0 |
|  | D3 | — | — | 1.0 | — | — |
|  | a1 | — | — | — | — | — |
|  | b1 | — | — | — | 0.1 | — |
|  | b2 | — | — | — | — | 0.1 |
|  | c1 | — | — | — | — | — |
|  | d1 | — | — | — | — | — |
|  | d2 | — | — | — | — | — |
|  | d3 | — | — | — | — | — |
| Stability | Acid value (mgKOH/g) | 0.01 | 0.01 | 0.01 | 0.01 | 0.01 |
|  | F content (ppm) | <1 | <1 | <1 | <1 | <1 |
|  | Color tone (ASTM color) | L0.5 | L0.5 | L0.5 | L0.5 | L0.5 |
|  | Catalyst appearance | No change | No change | No change | No change | No change |
| Lubricity | Pin wear (mg) | 2.5 | 2.7 | 2.6 | 2.7 | 2.8 |

|  |  | Example 5-16 | Example 5-17 |
|---|---|---|---|
| Composition (% by mass) | Base oil 1 | — | — |
|  | Base oil 2 | 98.71 | 96.515 |
|  | Base oil 3 | — | — |
|  | A1 | 0.03 | — |
|  | A2 | — | — |
|  | A3 | — | 0.03 |
|  | B1 | — | 0.15 |
|  | B2 | — | — |
|  | B3 | 0.1 | — |
|  | C1 | — | 0.005 |
|  | C2 | 0.06 | — |
|  | D1 | — | 1.5 |
|  | D2 | — | — |
|  | D3 | 1.0 | — |
|  | a1 | — | — |
|  | b1 | 0.1 | 0.3 |
|  | b2 | — | — |
|  | c1 | — | — |
|  | d1 | — | 1.5 |
|  | d2 | — | — |
|  | d3 | — | — |
| Stability | Acid value (mgKOH/g) | 0.01 | 0.01 |
|  | F content (ppm) | <1 | <1 |
|  | Color tone (ASTM color) | L0.5 | L0.5 |
|  | Catalyst appearance | No change | No change |
| Lubricity | Pin wear (mg) | 2.5 | 2.5 |

TABLE 17

|  |  | Example 5-18 | Example 5-19 | Example 5-20 | Example 5-21 | Example 5-22 | Example 5-23 |
|---|---|---|---|---|---|---|---|
| Composition (% by mass) | Base oil 1 | — | — | — | — | — | — |
|  | Base oil 2 | 96.46 | 96.515 | 96.46 | — | — | — |
|  | Base oil 3 | — | — | — | 98.765 | 98.71 | 93.71 |
|  | A1 | — | — | — | 0.03 | 0.03 | 0.03 |
|  | A2 | — | — | — | — | — | — |
|  | A3 | 0.03 | 0.03 | 0.03 | — | — | — |
|  | B1 | 0.15 | — | — | 0.1 | — | — |
|  | B2 | — | 0.15 | — | — | 0.1 | — |
|  | B3 | — | — | 0.15 | — | — | 0.1 |
|  | C1 | — | 0.005 | — | 0.005 | — | — |
|  | C2 | 0.06 | — | 0.06 | — | 0.06 | 0.06 |
|  | D1 | — | — | — | 1.0 | — | — |
|  | D2 | — | 1.5 | — | — | 1.0 | — |
|  | D3 | 1.5 | — | 1.5 | — | — | 1.0 |
|  | a1 | — | — | — | — | — | — |
|  | b1 | — | 0.3 | — | 0.1 | — | 0.1 |
|  | b2 | 0.3 | — | 0.3 | — | 0.1 | — |
|  | c1 | — | — | — | — | — | — |
|  | d1 | 1.5 | — | — | — | — | — |
|  | d2 | — | 1.5 | — | — | — | — |
|  | d3 | — | — | 1.5 | — | — | — |
| Stability | Acid value (mgKOH/g) | 0.01 | 0.01 | 0.01 | 0.01 | 0.01 | 0.01 |
|  | F content (ppm) | <1 | <1 | <1 | <1 | <1 | <1 |
|  | Color tone (ASTM color) | L0.5 | L0.5 | L0.5 | L0.5 | L0.5 | L0.5 |
|  | Catalyst appearance | No change | No change | No change | No change | No change | No change |
| Lubricity | Pin wear (mg) | 2.7 | 2.9 | 2.2 | 2.4 | 2.5 | 2.1 |

TABLE 18

|  |  | Comp. Ex. 5-1 | Comp. Ex. 5-2 | Comp. Ex. 5-3 | Comp. Ex. 5-4 | Comp. Ex. 5-5 |
|---|---|---|---|---|---|---|
| Composition (% by mass) | Base oil 1 | 100 | 98.895 | 98.965 | 98.87 | 99.865 |
|  | Base oil 2 | — | — | — | — | — |
|  | Base oil 3 | — | — | — | — | — |
|  | A1 | — | — | 0.03 | 0.03 | 0.03 |
|  | A2 | — | — | — | — | — |
|  | A3 | — | — | — | — | — |
|  | B1 | — | 0.1 | — | 0.1 | 0.1 |
|  | B2 | — | — | — | — | — |
|  | B3 | — | — | — | — | — |
|  | C1 | — | 0.005 | 0.005 | — | 0.005 |
|  | C2 | — | — | — | — | — |
|  | D1 | — | 1.0 | 1.0 | 1.0 | — |
|  | D2 | — | — | — | — | — |
|  | D3 | — | — | — | — | — |
|  | a1 | — | — | — | — | — |
|  | b1 | — | — | — | — | — |
|  | b2 | — | — | — | — | — |
|  | c1 | — | — | — | — | — |
|  | d1 | — | — | — | — | — |
|  | d2 | — | — | — | — | — |
|  | d3 | — | — | — | — | — |
| Stability | Acid value (mgKOH/g) | 1.56 | 0.43 | 0.45 | 0.39 | 1.17 |
|  | F content (ppm) | 328 | 36 | 32 | 87 | 180 |
|  | Color tone (ASTM color) | L2.5 | L2.0 | L2.0 | L2.0 | L2.0 |
|  | Catalyst appearance | Coloration | Coloration | Coloration | Coloration | Coloration |
| Lubricity | Pin wear (mg) | 15.2 | 18.2 | 3.1 | 2.9 | 2.8 |

|  |  | Comp. Ex. 5-6 | Comp. Ex. 5-7 | Comp. Ex. 5-8 | Comp. Ex. 5-9 | Comp. Ex. 5-10 |
|---|---|---|---|---|---|---|
| Composition (% by mass) | Base oil 1 | 98.865 | 97.895 | 98.865 | 98.865 | 98.865 |
|  | Base oil 2 | — | — | — | — | — |
|  | Base oil 3 | — | — | — | — | — |
|  | A1 | — | — | 0.03 | 0.03 | 0.03 |
|  | A2 | — | — | — | — | — |
|  | A3 | — | — | — | — | — |
|  | B1 | 0.1 | 0.1 | — | 0.1 | 0.1 |
|  | B2 | — | — | — | — | — |
|  | B3 | — | — | — | — | — |
|  | C1 | 0.005 | 0.005 | 0.005 | — | 0.005 |
|  | C2 | — | — | — | — | — |
|  | D1 | 1.0 | 1.0 | 1.0 | 1.0 | — |

TABLE 18-continued

|  |  |  |  |  |  |  |
|---|---|---|---|---|---|---|
|  | D2 | — | — | — | — | — |
|  | D3 | — | — | — | — | — |
|  | a1 | 0.03 | 1.0 | — | — | — |
|  | b1 | — | — | 0.1 | — | — |
|  | b2 | — | — | — | — | — |
|  | c1 | — | — | — | 0.005 | — |
|  | d1 | — | — | — | — | 1.0 |
|  | d2 | — | — | — | — | — |
|  | d3 | — | — | — | — | — |
| Stability | Acid value (mgKOH/g) | 0.21 | 1.87 | 0.41 | 0.58 | 0.98 |
|  | F content (ppm) | 65 | 485 | 31 | 52 | 151 |
|  | Color tone (ASTM color) | L2.0 | L2.0 | L2.0 | L2.0 | L2.0 |
|  | Catalyst appearance | Coloration | Coloration | Coloration | Coloration | Coloration |
| Lubricity | Pin wear (mg) | 14.9 | 4.9 | 3.1 | 2.8 | 2.7 |

Examples 6-1 to 6-46, Comparative Examples 6-1 to 6-10

For Examples 6-1 to 6-46 and Comparative Examples 6-1 to 6-10, refrigerating machine oils were prepared using the base oils and additives listed below. The properties of the obtained refrigerating machine oils are shown in Tables 19 to 24.
(Base Oils)
Base oil 1: Polyethylenepropyleneglycol monomethyl ether
Base oil 2: Polypropyleneglycol dimethyl ether
Base oil 3: Polyvinyl ether
(Additives)
A1: Oleylamine salt of di(2-ethylhexyl)acid phosphate
A2: 2-Ethylhexylamine salt of dioctyl acid phosphate
A3: Mono(C11-C14 mixed alkyl)amine salt of dihexyl acid phosphate
B1: Dioctyldiphenylamine
B2: Dinonyldiphenylamine
B3: Octylphenyl-α-naphthylamine
C1: Benzotriazole
C2: N,N-bis(2-Ethylhexyl)-methylbenzotriazole
D1: 1,2-Epoxycyclohexane
D2: 3,4-Epoxycyclohexylmethyl-3,4-epoxycyclohexane carboxylate
D3: 4-(1'-Methylepoxyethyl)-1,2-epoxy-2-methylcyclohexane
a1: Tricresyl phosphate
a2: di(2-Ethylhexyl)acid phosphate
a3: Dilaurylhydrogen phosphite
b1: 2,6-di-t-Butyl-p-cresol
b2: C7-C9 Branched alkyl ester of 3,5-bis(1,1-Dimethyl-ethyl)-4-hydroxy-benzenepropanoic acid
c1: 2,5-bis(Alkyldithio) 1,3,4-thiadiazole
d1: p-t-Butylphenyl glycidyl ether
d2: Glycidyl-2,2'-dimethyl octanoate
d3: 1,2-Epoxyoctadecane Each of the refrigerating machine oils obtained in Examples 6-1 to 6-46 and Comparative Examples 6-1 to 6-10 was subjected to an evaluation test in the following manner.
(Thermal/Chemical Stability Evaluation)
A test was conducted by filling 30 g of a sample oil prepared to a moisture content of no greater than 100 ppm by mass (initial color tone: L0.5) and 30 g of 2,3,3,3-tetrafluoropropene into a 200 ml stainless steel autoclave together with a catalyst (iron, copper and aluminum wires), and then heating this to 175° C. and storing for 2 weeks. Following the test, the refrigerating machine oil composition color tone, acid value and fluorine ion content and changes in catalyst outer appearance were measured. The obtained results are shown in Tables 19 to 24.
(Evaluation of Lubricity)
A test was conducted for 1 hour according to ASTM D2670 while blowing 2,3,3,3-tetrafluoropropene into the sample oil at 10 L/h, with an oil temperature of 80° C. and a load of 250 LB, and the pin wear after the test was measured. The obtained results are shown in Tables 19 to 24.

TABLE 19

|  |  | Example 6-1 | Example 6-2 | Example 6-3 | Example 6-4 | Example 6-5 |
|---|---|---|---|---|---|---|
| Composition (% by mass) | Base oil 1 | 98.835 | 98.78 | 98.78 | 98.735 | 98.68 |
|  | Base oil 2 | — | — | — | — | — |
|  | Base oil 3 | — | — | — | — | — |
|  | A1 | 0.06 | 0.06 | 0.06 | 0.06 | 0.06 |
|  | A2 | — | — | — | — | — |
|  | A3 | — | — | — | — | — |
|  | B1 | 0.1 | — | — | 0.1 | — |
|  | B2 | — | 0.1 | — | — | 0.1 |
|  | B3 | — | — | 0.1 | — | — |
|  | C1 | 0.005 | — | — | 0.005 | — |
|  | C2 | — | 0.06 | 0.06 | — | 0.06 |
|  | D1 | 1.0 | — | — | 1.0 | — |
|  | D2 | — | 1.0 | — | — | 1.0 |
|  | D3 | — | — | 1.0 | — | — |
|  | a1 | — | — | — | — | — |
|  | b1 | — | — | — | 0.1 | — |
|  | b2 | — | — | — | — | 0.1 |
|  | c1 | — | — | — | — | — |
|  | d1 | — | — | — | — | — |
|  | d2 | — | — | — | — | — |
|  | d3 | — | — | — | — | — |

TABLE 19-continued

| | | | | | | |
|---|---|---|---|---|---|---|
| Stability | Acid value (mgKOH/g) | 0.01 | 0.01 | 0.01 | 0.01 | 0.01 |
| | F content (ppm) | <1 | <1 | <1 | <1 | <1 |
| | Color tone (ASTM color) | L0.5 | L0.5 | L0.5 | L0.5 | L0.5 |
| | Catalyst appearance | No change | No change | No change | No change | No change |
| Lubricity | Pin wear (mg) | 2.7 | 12.5 | 2.3 | 2.4 | 2.4 |

| | | Example 6-6 | Example 6-7 | Example 6-8 | Example 6-9 | Example 6-10 |
|---|---|---|---|---|---|---|
| Composition (% by mass) | Base oil 1 | 98.68 | 96.485 | 96.43 | 96.485 | 96.43 |
| | Base oil 2 | — | — | — | — | — |
| | Base oil 3 | — | — | — | — | — |
| | A1 | 0.06 | — | — | — | — |
| | A2 | — | 0.06 | 0.06 | 0.06 | 0.06 |
| | A3 | — | — | — | — | — |
| | B1 | — | 0.15 | 0.15 | — | — |
| | B2 | — | — | — | 0.15 | — |
| | B3 | 0.1 | — | — | — | 0.15 |
| | C1 | — | 0.005 | — | 0.005 | — |
| | C2 | 0.06 | — | 0.06 | — | 0.06 |
| | D1 | — | 1.5 | — | — | — |
| | D2 | — | — | — | 1.5 | — |
| | D3 | 1.0 | — | 1.5 | — | 1.5 |
| | a1 | — | — | — | — | — |
| | b1 | 0.1 | 0.3 | — | 0.3 | — |
| | b2 | — | — | 0.3 | — | 0.3 |
| | c1 | — | — | — | — | — |
| | d1 | — | 1.5 | 1.5 | — | — |
| | d2 | — | — | — | 1.5 | — |
| | d3 | — | — | — | — | 1.5 |
| Stability | Acid value (mgKOH/g) | 0.01 | 0.01 | 0.01 | 0.01 | 0.01 |
| | F content (ppm) | <1 | <1 | <1 | <1 | <1 |
| | Color tone (ASTM color) | L0.5 | L0.5 | L0.5 | L0.5 | L0.5 |
| | Catalyst appearance | No change | No change | No change | No change | No change |
| Lubricity | Pin wear (mg) | 2.6 | 2.4 | 2.8 | 2.4 | 2.4 |

TABLE 20

| | | Example 6-11 | Example 6-12 | Example 6-13 | Example 6-14 | Example 6-15 |
|---|---|---|---|---|---|---|
| Composition (% by mass) | Base oil 1 | — | — | — | — | — |
| | Base oil 2 | 98.835 | 98.78 | 98.78 | 98.735 | 98.68 |
| | Base oil 3 | — | — | — | — | — |
| | A1 | 0.06 | 0.06 | 0.06 | 0.06 | 0.06 |
| | A2 | — | — | — | — | — |
| | A3 | — | — | — | — | — |
| | B1 | 0.1 | — | — | 0.1 | — |
| | B2 | — | 0.1 | — | — | 0.1 |
| | B3 | — | — | 0.1 | — | — |
| | C1 | 0.005 | — | — | 0.005 | — |
| | C2 | — | 0.06 | 0.06 | — | 0.06 |
| | D1 | 1.0 | — | — | 1.0 | — |
| | D2 | — | 1.0 | — | — | 1.0 |
| | D3 | — | — | 1.0 | — | — |
| | a1 | — | — | — | — | — |
| | b1 | — | — | — | 0.1 | — |
| | b2 | — | — | — | — | 0.1 |
| | c1 | — | — | — | — | — |
| | d1 | — | — | — | — | — |
| | d2 | — | — | — | — | — |
| | d3 | — | — | — | — | — |
| Stability | Acid value (mgKOH/g) | 0.01 | 0.01 | 0.01 | 0.01 | 0.01 |
| | F content (ppm) | <1 | <1 | <1 | <1 | <1 |
| | Color tone (ASTM color) | L0.5 | L0.5 | L0.5 | L0.5 | L0.5 |
| | Catalyst appearance | No change | No change | No change | No change | No change |
| Lubricity | Pin wear (mg) | 2.2 | 2.3 | 2.4 | 2.5 | 2.2 |

| | | Example 6-16 | Example 6-17 | Example 6-18 | Example 6-19 | Example 6-20 |
|---|---|---|---|---|---|---|
| Composition (% by mass) | Base oil 1 | — | — | — | — | — |
| | Base oil 2 | 98.68 | 96.485 | 96.43 | 96.485 | 96.43 |
| | Base oil 3 | — | — | — | — | — |
| | A1 | 0.06 | — | — | — | — |
| | A2 | — | — | — | — | — |
| | A3 | — | 0.06 | 0.06 | 0.06 | 0.06 |

TABLE 20-continued

|  |  |  |  |  |  |  |
|---|---|---|---|---|---|---|
|  | B1 | — | 0.15 | 0.15 | — | — |
|  | B2 | — | — | — | 0.15 | — |
|  | B3 | 0.1 | — | — | — | 0.15 |
|  | C1 | — | 0.005 | — | 0.005 | — |
|  | C2 | 0.06 | — | 0.06 | — | 0.06 |
|  | D1 | — | 1.5 | — | — | — |
|  | D2 | — | — | — | 1.5 | — |
|  | D3 | 1.0 | — | 1.5 | — | 1.5 |
|  | a1 | — | — | — | — | — |
|  | b1 | 0.1 | 0.3 | — | 0.3 | — |
|  | b2 | — | — | 0.3 | — | 0.3 |
|  | c1 | — | — | — | — | — |
|  | d1 | — | 1.5 | 1.5 | — | — |
|  | d2 | — | — | — | 1.5 | — |
|  | d3 | — | — | — | — | 1.5 |
| Stability | Acid value (mgKOH/g) | 0.01 | 0.01 | 0.01 | 0.01 | 0.01 |
|  | F content (ppm) | <1 | <1 | <1 | <1 | <1 |
|  | Color tone (ASTM color) | L0.5 | L0.5 | L0.5 | L0.5 | L0.5 |
|  | Catalyst appearance | No change | No change | No change | No change | No change |
| Lubricity | Pin wear (mg) | 2.1 | 2.5 | 2.5 | 2.7 | 2.4 |

TABLE 21

|  |  | Example 6-21 | Example 6-22 | Example 6-23 | Example 6-24 | Example 6-25 |
|---|---|---|---|---|---|---|
| Composition (% by mass) | Base oil 1 | — | — | — | 98.805 | 98.75 |
|  | Base oil 2 | — | — | — | — | — |
|  | Base oil 3 | 98.735 | 98.68 | 98.68 | — | — |
|  | A1 | 0.06 | 0.06 | 0.06 | 0.09 | 0.09 |
|  | A2 | — | — | — | — | — |
|  | A3 | — | — | — | — | — |
|  | B1 | 0.1 | — | — | 0.1 | — |
|  | B2 | — | 0.1 | — | — | 0.1 |
|  | B3 | — | — | 0.1 | — | — |
|  | C1 | 0.005 | — | — | 0.005 | — |
|  | C2 | — | 0.06 | 0.06 | — | 0.06 |
|  | D1 | 1.0 | — | — | 1.0 | — |
|  | D2 | — | 1.0 | — | — | 1.0 |
|  | D3 | — | — | 1.0 | — | — |
|  | a1 | — | — | — | — | — |
|  | b1 | 0.1 | — | 0.1 | — | — |
|  | b2 | — | 0.1 | — | — | — |
|  | c1 | — | — | — | — | — |
|  | d1 | — | — | — | — | — |
|  | d2 | — | — | — | — | — |
|  | d3 | — | — | — | — | — |
| Stability | Acid value (mgKOH/g) | 0.01 | 0.01 | 0.01 | 0.01 | 0.01 |
|  | F content (ppm) | <1 | <1 | <1 | <1 | <1 |
|  | Color tone (ASTM color) | L0.5 | L0.5 | L0.5 | L0.5 | L0.5 |
|  | Catalyst appearance | No change | No change | No change | No change | No change |
| Lubricity | Pin wear (mg) | 2.5 | 2.4 | 2.8 | 2.2 | 2.1 |

|  |  | Example 6-26 | Example 6-27 | Example 6-28 |
|---|---|---|---|---|
| Composition (% by mass) | Base oil 1 | 98.75 | 98.705 | 98.65 |
|  | Base oil 2 | — | — | — |
|  | Base oil 3 | — | — | — |
|  | A1 | 0.09 | 0.09 | 0.09 |
|  | A2 | — | — | — |
|  | A3 | — | — | — |
|  | B1 | — | 0.1 | — |
|  | B2 | — | — | 0.1 |
|  | B3 | 0.1 | — | — |
|  | C1 | — | 0.005 | — |
|  | C2 | 0.06 | — | 0.06 |
|  | D1 | — | 1.0 | — |
|  | D2 | — | — | 1.0 |
|  | D3 | 1.0 | — | — |
|  | a1 | — | — | — |
|  | b1 | — | 0.1 | — |
|  | b2 | — | — | 0.1 |
|  | c1 | — | — | — |
|  | d1 | — | — | — |
|  | d2 | — | — | — |
|  | d3 | — | — | — |

TABLE 21-continued

| | | | | |
|---|---|---|---|---|
| Stability | Acid value (mgKOH/g) | 0.01 | 0.01 | 0.01 |
| | F content (ppm) | <1 | <1 | <1 |
| | Color tone (ASTM color) | L0.5 | L0.5 | L0.5 |
| | Catalyst appearance | No change | No change | No change |
| Lubricity | Pin wear (mg) | 2.9 | 2.5 | 2.4 |

TABLE 22

| | | Example 6-29 | Example 6-30 | Example 6-31 | Example 6-32 | Example 6-33 |
|---|---|---|---|---|---|---|
| Composition (% by mass) | Base oil 1 | 98.65 | 96.455 | 96.4 | 96.455 | 96.4 |
| | Base oil 2 | — | — | — | — | — |
| | Base oil 3 | — | — | — | — | — |
| | A1 | 0.09 | — | — | — | — |
| | A2 | — | 0.09 | 0.09 | 0.09 | 0.09 |
| | A3 | — | — | — | — | — |
| | B1 | — | 0.15 | 0.15 | — | — |
| | B2 | — | — | — | 0.15 | — |
| | B3 | 0.1 | — | — | — | 0.15 |
| | C1 | — | 0.005 | — | 0.005 | — |
| | C2 | 0.06 | — | 0.06 | — | 0.06 |
| | D1 | — | 1.5 | — | — | — |
| | D2 | — | — | — | 1.5 | — |
| | D3 | 1.0 | — | 1.5 | — | 1.5 |
| | a1 | — | — | — | — | — |
| | b1 | 0.1 | 0.3 | — | 0.3 | — |
| | b2 | — | — | 0.3 | — | 0.3 |
| | c1 | — | — | — | — | — |
| | d1 | — | 1.5 | 1.5 | — | — |
| | d2 | — | — | — | 1.5 | — |
| | d3 | — | — | — | — | 1.5 |
| Stability | Acid value (mgKOH/g) | 0.01 | 0.01 | 0.01 | 0.01 | 0.01 |
| | F content (ppm) | <1 | <1 | <1 | <1 | <1 |
| | Color tone (ASTM color) | L0.5 | L0.5 | L0.5 | L0.5 | L0.5 |
| | Catalyst appearance | No change | No change | No change | No change | No change |
| Lubricity | Pin wear (mg) | 2.6 | 2.3 | 2.1 | 2.5 | 2.4 |

| | | Example 6-34 | Example 6-35 | Example 6-36 | Example 6-37 | Example 6-38 |
|---|---|---|---|---|---|---|
| Composition (% by mass) | Base oil 1 | — | — | — | — | — |
| | Base oil 2 | 98.805 | 98.75 | 98.75 | 98.705 | 98.65 |
| | Base oil 3 | — | — | — | — | — |
| | A1 | 0.09 | 0.09 | 0.09 | 0.09 | 0.09 |
| | A2 | — | — | — | — | — |
| | A3 | — | — | — | — | — |
| | B1 | 0.1 | — | — | 0.1 | — |
| | B2 | — | 0.1 | — | — | 0.1 |
| | B3 | — | — | 0.1 | — | — |
| | C1 | 0.005 | — | — | 0.005 | — |
| | C2 | — | 0.06 | 0.06 | — | 0.06 |
| | D1 | 1.0 | — | — | 1.0 | — |
| | D2 | — | 1.0 | — | — | 1.0 |
| | D3 | — | — | 1.0 | — | — |
| | a1 | — | — | — | — | — |
| | b1 | — | — | — | 0.1 | — |
| | b2 | — | — | — | — | 0.1 |
| | c1 | — | — | — | — | — |
| | d1 | — | — | — | — | — |
| | d2 | — | — | — | — | — |
| | d3 | — | — | — | — | — |
| Stability | Acid value (mgKOH/g) | 0.01 | 0.01 | 0.01 | 0.01 | 0.01 |
| | F content (ppm) | <1 | <1 | <1 | <1 | <1 |
| | Color tone (ASTM color) | L0.5 | L0.5 | L0.5 | L0.5 | L0.5 |
| | Catalyst appearance | No change | No change | No change | No change | No change |
| Lubricity | Pin wear (mg) | 2.7 | 2.6 | 2.4 | 2.8 | 2.4 |

TABLE 23

| | | Example 6-39 | Example 6-40 | Example 6-41 | Example 6-42 | Example 6-43 |
|---|---|---|---|---|---|---|
| Composition (% by mass) | Base oil 1 | — | — | — | — | — |
| | Base oil 2 | 98.65 | 96.455 | 96.4 | 96.455 | 96.4 |

TABLE 23-continued

|  |  |  |  |  |  |  |
|---|---|---|---|---|---|---|
|  | Base oil 3 | — | — | — | — | — |
|  | A1 | 0.09 | — | — | — | — |
|  | A2 | — | — | — | — | — |
|  | A3 | — | 0.09 | 0.09 | 0.09 | 0.09 |
|  | B1 | — | 0.15 | 0.15 | — | — |
|  | B2 | — | — | — | 0.15 | — |
|  | B3 | 0.1 | — | — | — | 0.15 |
|  | C1 | — | 0.005 | — | 0.005 | — |
|  | C2 | 0.06 | — | 0.06 | — | 0.06 |
|  | D1 | — | 1.5 | — | — | — |
|  | D2 | — | — | — | 1.5 | — |
|  | D3 | 1.0 | — | 1.5 | — | 1.5 |
|  | a1 | — | — | — | — | — |
|  | b1 | 0.1 | 0.3 | — | 0.3 | — |
|  | b2 | — | — | 0.3 | — | 0.3 |
|  | c1 | — | — | — | — | — |
|  | d1 | — | 1.5 | 1.5 | — | — |
|  | d2 | — | — | — | 1.5 | — |
|  | d3 | — | — | — | — | 1.5 |
| Stability | Acid value (mgKOH/g) | 0.01 | 0.01 | 0.01 | 0.01 | 0.01 |
|  | F content (ppm) | <1 | <1 | <1 | <1 | <1 |
|  | Color tone (ASTM color) | L0.5 | L0.5 | L0.5 | L0.5 | L0.5 |
|  | Catalyst appearance | No change | No change | No change | No change | No change |
| Lubricity | Pin wear (mg) | 2.2 | 2.1 | 2.2 | 2.5 | 2.4 |

|  |  | Example 6-44 | Example 6-45 | Example 6-46 |
|---|---|---|---|---|
| Composition (% by mass) | Base oil 1 | — | — | — |
|  | Base oil 2 | — | — | — |
|  | Base oil 3 | 100 | 100 | 100 |
|  | A1 | 0.09 | 0.09 | 0.09 |
|  | A2 | — | — | — |
|  | A3 | — | — | — |
|  | B1 | 0.1 | — | — |
|  | B2 | — | 0.1 | — |
|  | B3 | — | — | 0.1 |
|  | C1 | 0.005 | — | — |
|  | C2 | — | 0.06 | 0.06 |
|  | D1 | 1.0 | — | — |
|  | D2 | — | 1.0 | — |
|  | D3 | — | — | 1.0 |
|  | a1 | — | — | — |
|  | b1 | 0.1 | — | 0.1 |
|  | b2 | — | 0.1 | — |
|  | c1 | — | — | — |
|  | d1 | — | — | — |
|  | d2 | — | — | — |
|  | d3 | — | — | — |
| Stability | Acid value (mgKOH/g) | 0.01 | 0.01 | 0.01 |
|  | F content (ppm) | <1 | <1 | <1 |
|  | Color tone (ASTM color) | L0.5 | L0.5 | L0.5 |
|  | Catalyst appearance | No change | No change | No change |
| Lubricity | Pin wear (mg) | 2.1 | 2.2 | 2.1 |

TABLE 24

|  |  | Comp. Ex. 6-1 | Comp. Ex. 6-2 | Comp. Ex. 6-3 | Comp. Ex. 64 | Comp. Ex. 6-5 |
|---|---|---|---|---|---|---|
| Composition (% by mass) | Base oil 1 | 100 | 98.895 | 98.935 | 98.84 | 99.835 |
|  | Base oil 2 | — | — | — | — | — |
|  | Base oil 3 | — | — | — | — | — |
|  | A1 | — | — | 0.06 | 0.06 | 0.06 |
|  | A2 | — | — | — | — | — |
|  | A3 | — | — | — | — | — |
|  | B1 | — | 0.1 | — | 0.1 | 0.1 |
|  | B2 | — | — | — | — | — |
|  | B3 | — | — | — | — | — |
|  | C1 | — | 0.005 | 0.005 | — | 0.005 |
|  | C2 | — | — | — | — | — |
|  | D1 | — | 1.0 | 1.0 | 1.0 | — |
|  | D2 | — | — | — | — | — |
|  | D3 | — | — | — | — | — |
|  | a1 | — | — | — | — | — |
|  | b1 | — | — | — | — | — |
|  | b2 | — | — | — | — | — |

TABLE 24-continued

|  |  | | | | | |
|---|---|---|---|---|---|---|
|  | c1 | — | — | — | — | — |
|  | d1 | — | — | — | — | — |
|  | d2 | — | — | — | — | — |
|  | d3 | — | — | — | — | — |
| Stability | Acid value (mgKOH/g) | 1.56 | 0.43 | 0.42 | 0.45 | 1.21 |
|  | F content (ppm) | 328 | 36 | 34 | 91 | 190 |
|  | Color tone (ASTM color) | L2.5 | L2.0 | L2.0 | L2.0 | L2.0 |
|  | Catalyst appearance | Coloration | Coloration | Coloration | Coloration | Coloration |
| Lubricity | Pin wear (mg) | 15.2 | 18.2 | 2.1 | 2.4 | 2.5 |

|  |  | Comp. Ex. 6-6 | Comp. Ex. 6-7 | Comp. Ex. 6-8 | Comp. Ex. 6-9 | Comp. Ex. 6-10 |
|---|---|---|---|---|---|---|
| Composition (% by mass) | Base oil 1 | 98.835 | 97.895 | 98.835 | 98.835 | 98.835 |
|  | Base oil 2 | — | — | — | — | — |
|  | Base oil 3 | — | — | — | — | — |
|  | A1 | — | — | 0.06 | 0.06 | 0.06 |
|  | A2 | — | — | — | — | — |
|  | A3 | — | — | — | — | — |
|  | B1 | 0.1 | 0.1 | — | 0.1 | 0.1 |
|  | B2 | — | — | — | — | — |
|  | B3 | — | — | — | — | — |
|  | C1 | 0.005 | 0.005 | 0.005 | — | 0.005 |
|  | C2 | — | — | — | — | — |
|  | D1 | 1.0 | 1.0 | 1.0 | 1.0 | — |
|  | D2 | — | — | — | — | — |
|  | D3 | — | — | — | — | — |
|  | a1 | 0.06 | 1 | — | — | — |
|  | b1 | — | — | 0.1 | — | — |
|  | b2 | — | — | — | — | — |
|  | c1 | — | — | — | 0.005 | — |
|  | d1 | — | — | — | — | 1.0 |
|  | d2 | — | — | — | — | — |
|  | d3 | — | — | — | — | — |
| Stability | Acid value (mgKOH/g) | 0.21 | 1.87 | 0.45 | 0.62 | 1.01 |
|  | F content (ppm) | 65 | 485 | 33 | 65 | 148 |
|  | Color tone (ASTM color) | L2.0 | L2.0 | L2.0 | L2.0 | L2.0 |
|  | Catalyst appearance | Coloration | Coloration | Coloration | Coloration | Coloration |
| Lubricity | Pin wear (mg) | 14.9 | 4.9 | 2.6 | 2.4 | 2.2 |

Examples 7-1 to 7-10, Comparative Examples 7-1 to 7-8

For Examples 7-1 to 7-10 and Comparative Examples 7-1 to 7-8, refrigerating machine oils were prepared using the base oils and additives listed below, and with moisture contents adjusted to the prescribed values. The properties of the obtained refrigerating machine oils are shown in Tables 25 to 26.

(Base Oils)
Base oil: Polyethylenepropyleneglycol monomethyl ether
(Additives)
A: Oleylamine salt of di(2-Ethylhexyl)acid phosphate
B: Dioctyldiphenylamine
C: Benzotriazole
D: 1,2-Epoxycyclohexane
d: p-t-Butylphenyl glycidyl ether Each of the refrigerating machine oils obtained in Examples 7-1 to 7-10 and Comparative Examples 7-1 to 7-8 was subjected to an evaluation test in the following manner.

(Thermal/Chemical Stability Evaluation)

A test was conducted by filling 30 g of a sample oil (initial color tone: L0.5), 30 g of 2,3,3,3-tetrafluoropropene, a catalyst (iron, copper and aluminum wires) and 50 cc of air into a 200 ml stainless steel autoclave, and then heating this to 175° C. and storing for 2 weeks. Following the test, the refrigerating machine oil composition color tone, acid value and fluorine ion content and changes in catalyst outer appearance were measured. The obtained results are shown in Tables 25 and 26.

(Evaluation of Lubricity)

A test was conducted for 1 hour according to ASTM D2670 while blowing 2,3,3,3-tetrafluoropropene into the sample oil at 10 L/h, with an oil temperature of 80° C. and a load of 250 LB, and the pin wear after the test was measured. The obtained results are shown in Tables 25 and 26.

TABLE 25

|  |  | Example 7-1 | Example 7-2 | Example 7-3 | Example 7-4 | Example 7-5 |
|---|---|---|---|---|---|---|
| Composition (% by mass) | Base oil | 98.895 | 98.965 | 98.87 | 99.865 | 98.865 |
|  | A | — | 0.03 | 0.03 | 0.03 | 0.03 |
|  | B | 0.1 | — | 0.1 | 0.1 | 0.1 |
|  | C | 0.005 | 0.005 | — | 0.005 | 0.005 |
|  | D | 1.0 | 1.0 | 1.0 | — | — |
|  | d | — | — | — | — | 1.0 |
|  | Moisture content (ppm by mass) | 500 | 500 | 500 | 500 | 500 |
| Stability | Acid value (mgKOH/g) | 0.12 | 0.11 | 0.13 | 1.87 | 0.78 |
|  | F content (ppm) | 13 | 10 | 13 | 349 | 143 |

TABLE 25-continued

|  |  |  |  |  |  |  |
|---|---|---|---|---|---|---|
|  | Color tone (ASTM color) | L0.5 | L0.5 | L0.5 | L2.5 | L2.0 |
|  | Catalyst appearance | No change | No change | No change | Coloration | Coloration |

|  |  | Example 7-6 | Example 7-7 | Example 7-8 | Example 7-9 | Example 7-10 |
|---|---|---|---|---|---|---|
| Composition (% by mass) | Base oil | 98.895 | 98.965 | 98.87 | 99.865 | 98.865 |
|  | A | — | 0.03 | 0.03 | 0.03 | 0.03 |
|  | B | 0.1 | — | 0.1 | 0.1 | 0.1 |
|  | C | 0.005 | 0.005 | — | 0.005 | 0.005 |
|  | D | 1.0 | 1.0 | 1.0 | — | — |
|  | d | — | — | — | — | 1.0 |
|  | Moisture content (ppm by mass.) | 5000 | 5000 | 5000 | 5000 | 5000 |
| Stability | Acid value (mgKOH/g) | 0.14 | 0.14 | 0.11 | 2.79 | 0.97 |
|  | F content (ppm) | 15 | 14 | 11 | 509 | 172 |
|  | Color tone (ASTM color) | L0.5 | L0.5 | L0.5 | L4.0 | L2.5 |
|  | Catalyst appearance | No change | No change | No change | Coloration | Coloration |

TABLE 26

|  |  | Comp. Ex. 7-1 | Comp. Ex. 7-2 | Comp. Ex. 7-3 | Comp. Ex. 7-4 | Comp. Ex. 7-5 |
|---|---|---|---|---|---|---|
| Composition (% by mass) | Base oil | 100 | 100 | 100 | 98.895 | 98.965 |
|  | A | — | — | — | — | 0.03 |
|  | B | — | — | — | 0.1 | — |
|  | C | — | — | — | 0.005 | 0.005 |
|  | D | — | — | — | 1.0 | 1.0 |
|  | d | — | — | — | — | — |
|  | Moisture content (ppm by mass.) | 500 | 5000 | 0 | 0 | 0 |
| Stability | Acid value (mgKOH/g) | 2.11 | 3.89 | 1.56 | 0.43 | 0.45 |
|  | F content (ppm) | 439 | 541 | 328 | 36 | 32 |
|  | Color tone (ASTM color) | L3.0 | L4.0 | L2.5 | L2.0 | L2.0 |
|  | Catalyst appearance | Coloration | Coloration | Coloration | Coloration | Coloration |

|  |  | Comp. Ex. 7-6 | Comp. Ex. 7-7 | Comp. Ex. 7-8 |
|---|---|---|---|---|
| Composition (% by mass) | Base oil | 98.87 | 99.865 | 98.865 |
|  | A | 0.03 | 0.03 | 0.03 |
|  | B | 0.1 | 0.1 | 0.1 |
|  | C | — | 0.005 | 0.005 |
|  | D | 1.0 | — | — |
|  | d | — | — | 1.0 |
|  | Moisture content (ppm by mass.) | 0 | 0 | 0 |
| Stability | Acid value (mgKOH/g) | 0.39 | 1.17 | 0.98 |
|  | F content (ppm) | 87 | 180 | 151 |
|  | Color tone (ASTM color) | L2.0 | L2.0 | L2.0 |
|  | Catalyst appearance | Coloration | Coloration | Coloration |

The invention claimed is:

1. A working fluid composition for a refrigerating machine comprising a refrigerating machine oil and an unsaturated fluorinated hydrocarbon refrigerant, wherein the refrigerating machine oil comprises:
   a base oil containing an ether-based compound,
   an amine salt of an acidic phosphoric acid ester in an amount of 100 ppm by mass or greater based on the total amount of the refrigerating machine oil, and
   at least one compound selected from the group consisting of amine-based antioxidants, metal inactivating agents and alicyclic epoxy compounds.

2. A working fluid composition for a refrigerating machine according to claim 1, wherein the refrigerating machine oil comprises:
   the base oil containing an ether-based compound,
   the amine salt of an acidic phosphoric acid ester, and
   an amine-based antioxidant.

3. A working fluid composition for a refrigerating machine according to claim 1, wherein the refrigerating machine oil comprises:
   the base oil containing an ether-based compound,
   the amine salt of an acidic phosphoric acid ester, and
   a metal inactivating agent.

4. A working fluid composition for a refrigerating machine according to claim 1, wherein the refrigerating machine oil comprises:
   the base oil containing the ether-based compound,
   the amine salt of an acidic phosphoric acid ester in an amount of from 100 ppm by mass to 400 ppm by mass based on the total amount of the refrigerating machine oil, and
   an alicyclic epoxy compound.

5. A working fluid composition for a refrigerating machine according to claim 1, wherein the refrigerating machine oil comprises:
   the base oil containing the ether-based compound,
   the amine salt of an acidic phosphoric acid ester in an amount of 400 ppm by mass or greater based on the total amount of the refrigerating machine oil,
   and an alicyclic epoxy compound.

6. A working fluid composition for a refrigerating machine according to claim 1, wherein the refrigerating machine oil comprises:
the base oil containing the ether-based compound,
the amine salt of an acidic phosphoric acid ester in an amount of from 100 ppm by mass to 400 ppm by mass based on the total amount of the refrigerating machine oil,
an amine-based antioxidant,
an metal inactivating agent, and an alicyclic epoxy compound.

7. A working fluid composition for a refrigerating machine according to claim 1, wherein the refrigerating machine oil comprises:
the base oil containing the ether-based compound,
the amine salt of an acidic phosphoric acid ester in an amount of 400 ppm by mass or greater based on the total amount of the refrigerating machine oil,
the amine-based antioxidant,
the metal inactivating agent, and
an alicyclic epoxy compound.

8. A working fluid composition for a refrigerating machine according to claim 1, wherein the refrigerating machine oil comprises the base oil containing the ether-based compound and an alicyclic epoxy compound, and the refrigerating machine oil has a moisture content of 300-10,000 ppm by mass.

9. A working fluid composition for a refrigerating machine according to claim 1, comprising at least one compound selected from among 1,2,3,3,3-pentafluoropropene, 1,3,3,3-tetrafluoropropene, 2,3,3,3-tetrafluoropropene, 1,2,3,3-tetrafluoropropene and 3,3,3-trifluoropropene, as the unsaturated fluorinated hydrocarbon refrigerant.

10. A working fluid composition for a refrigerating machine according to claim 1, further comprising at least one component selected from among saturated hydrofluorocarbon, C3-5 hydrocarbon, dimethyl ether, carbon dioxide, bis(trifluoromethyl)sulfide and trifluoroiodomethane refrigerants.

11. A working fluid composition for a refrigerating machine according to claim 10, wherein the unsaturated fluorinated hydrocarbon refrigerant is at least one selected from among 1,2,3,3,3-pentafluoropropene, 1,3,3,3-tetrafluoropropene, 2,3,3,3-tetrafluoropropene, 1,2,3,3-tetrafluoropropene and 3,3,3-trifluoropropene, the saturated hydrofluorocarbon is at least one selected from among difluoromethane, pentafluoroethane, 1,1,2,2-tetrafluoroethane, 1,1,1,2-tetrafluoroethane, 1,1-difluoroethane, fluoroethane, 1,1,1,2,3,3,3-heptafluoropropane, 1,1,1,2,3,3-hexafluoropropane, 1,1,1,3,3,3-hexafluoropropane, 1,1,1,3,3-pentafluoropropane and 1,1,1,3,3-pentafluorobutane, and the C3-5 hydrocarbon is at least one selected from among propane, normal-butane, isobutane, 2-methylbutane and normal-pentane.

12. A refrigerating machine oil comprising:
a base oil containing an ether-based compound,
an amine salt of an acidic phosphoric acid ester in an amount of 100 ppm or greater by mass based on the total amount of the refrigerating machine oil, and
at least one compound selected from the group consisting of amine-based antioxidants, metal inactivating agents and alicyclic epoxy compounds,
the refrigerating machine oil being used together with an unsaturated fluorinated hydrocarbon refrigerant.

13. A refrigerating machine oil according to claim 12, comprising:
the base oil containing the ether-based compound,
the amine salt of an acidic phosphoric acid ester, and
an amine-based antioxidant,
the refrigerating machine oil being used together with the unsaturated fluorinated hydrocarbon refrigerant.

14. A refrigerating machine oil according to claim 12, comprising:
the base oil containing the ether-based compound,
the amine salt of an acidic phosphoric acid ester, and
a metal inactivating agent,
the refrigerating machine oil being used together with the unsaturated fluorinated hydrocarbon refrigerant.

15. A refrigerating machine oil according to claim 12, comprising the base oil containing the ether-based compound, the amine salt of an acidic phosphoric acid ester and an alicyclic epoxy compound,
wherein the content of the amine salt of the acidic phosphoric acid ester is from 100 ppm by mass to 400 ppm by mass based on the total amount of the refrigerating machine oil,
the refrigerating machine oil being used together with the unsaturated fluorinated hydrocarbon refrigerant.

16. A refrigerating machine oil according to claim 12, comprising the base oil containing the ether-based compound, the amine salt of an acidic phosphoric acid ester and an alicyclic epoxy compound,
wherein the content of the amine salt of the acidic phosphoric acid ester is 400 ppm by mass or greater based on the total amount of the refrigerating machine oil,
the refrigerating machine oil being used together with the unsaturated fluorinated hydrocarbon refrigerant.

17. A refrigerating machine oil according to claim 12, comprising the base oil containing the ether-based compound, the amine salt of an acidic phosphoric acid ester, an amine-based antioxidant, a metal inactivating agent, and an alicyclic epoxy compound,
wherein the content of the amine salt of the acidic phosphoric acid ester is from 100 ppm by mass to 400 ppm by mass based on the total amount of the refrigerating machine oil,
the refrigerating machine oil being used together with the unsaturated fluorinated hydrocarbon refrigerant.

18. A refrigerating machine oil according to claim 12, comprising the base oil containing the ether-based compound, the amine salt of an acidic phosphoric acid ester, an amine-based antioxidant, a metal inactivating agent, and an alicyclic epoxy compound,
wherein the content of the amine salt of the acidic phosphoric acid ester is 400 ppm by mass or greater based on the total amount of the refrigerating machine oil,
the refrigerating machine oil being used together with the unsaturated fluorinated hydrocarbon refrigerant.

19. A refrigerating machine oil according to claim 12, comprising the base oil containing the ether-based compound, and an alicyclic epoxy compound,
the refrigerating machine oil having a moisture content of 300-10,000 ppm by mass and being used together with the unsaturated fluorinated hydrocarbon refrigerant.

* * * * *